(12) United States Patent
Nojiri et al.

(10) Patent No.: US 10,805,495 B2
(45) Date of Patent: Oct. 13, 2020

(54) STORAGE MEDIUM STORING COMPUTER-READABLE INSTRUCTIONS FOR SELECTING PARAMETER SET FOR PROCESS ON SCAN DATA

(71) Applicant: Brother Kogyo Kabushiki Kaisha, Nagoya-shi, Aichi-ken (JP)

(72) Inventors: Hiroya Nojiri, Nagoya (JP); Yoji Sohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/672,757

(22) Filed: Nov. 4, 2019

(65) Prior Publication Data

US 2020/0068085 A1 Feb. 27, 2020

Related U.S. Application Data

(63) Continuation of application No. 16/232,270, filed on Dec. 26, 2018, now Pat. No. 10,498,917.

(30) Foreign Application Priority Data

Dec. 26, 2017 (JP) .................................. 2017-249471

(51) Int. Cl.
*H04N 1/00* (2006.01)

(52) U.S. Cl.
CPC ..... *H04N 1/00949* (2013.01); *H04N 1/00474* (2013.01); *H04N 1/00915* (2013.01); *H04N 2201/0094* (2013.01)

(58) Field of Classification Search
CPC ........... H04N 1/00949; H04N 1/00474; H04N 1/00915; H04N 2201/0094
USPC ......................................................... 358/1.13
See application file for complete search history.

(56) References Cited

U.S. PATENT DOCUMENTS

2018/0084123 A1* 3/2018 Naitoh ............... H04N 1/00408

FOREIGN PATENT DOCUMENTS

JP          2014-179816 A     9/2014

\* cited by examiner

*Primary Examiner* — Saeid Ebrahimi Dehkordy
(74) *Attorney, Agent, or Firm* — Banner & Witcoff, Ltd.

(57) ABSTRACT

A non-transitory computer-readable storage medium stores computer-readable instructions for a processor to perform a first and second processes. The first process comprises: generating first scan data; acquiring a first feature data set indicating features of the first scan data; selecting using the first feature data set as input data, one or more of target workflow parameter sets according to a selection procedure based on selection criteria indicated by selection criteria data; and executing a process on the first scan data according to one of the selected one or more target workflow parameter sets. The second process comprises: acquiring a workflow parameter set; generating second scan data; acquiring a second feature data set indicating features of the second scan data; and updating the selection criteria data to add the workflow parameter set to the target workflow parameter sets and to reflect the second feature data set in the selection criteria data.

21 Claims, 16 Drawing Sheets

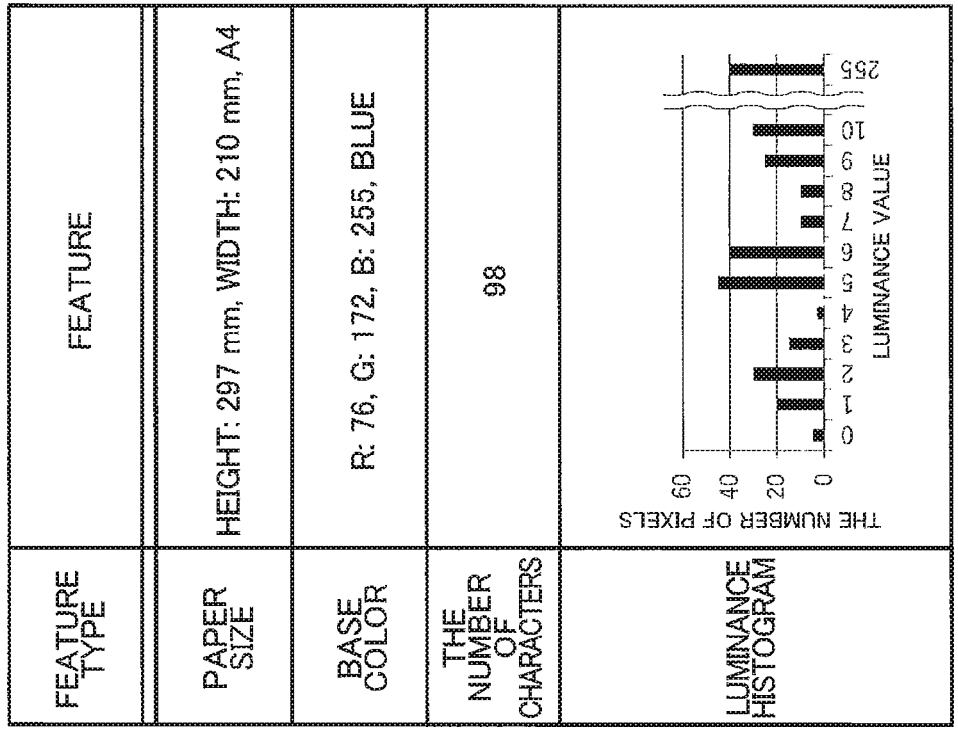

STORAGE MEDIUM STORING COMPUTER-READABLE INSTRUCTIONS FOR SELECTING PARAMETER SET FOR PROCESS ON SCAN DATA

CROSS REFERENCE TO RELATED APPLICATION

This application is a continuation of U.S. patent application Ser. No. 16/232,270 filed Dec. 26, 2018, which claims priority from Japanese Patent Application No. 2017-249471 filed Dec. 26, 2017. The entire contents of the priority applications are incorporated herein by reference.

TECHNICAL FIELD

The present disclosure relates to a storage medium storing computer-readable instructions for performing processes on scan data.

BACKGROUND

For example, Japanese Patent Application Publication No. 2014-179816 provides a system that identifies a workflow from a workflow number selected by the user operating a scanner and performs, on scan data generated by the scanner, various processes specified in the identified workflow, such as a scanning process, a character recognition process, and a numbering process.

SUMMARY

The system described in the Publication '816 requires the user to input a workflow number each time the user wishes to scan a sheet of paper or other original on the scanner. Inputting a workflow number for each scanning operation is not only time-consuming, but also, if the user were to make a mistake when entering the number, could result in the wrong workflow being executed.

In view of the foregoing, it is an object of the present disclosure to provide a technique capable of reducing the time and effort required for selecting workflows and capable of reducing the potential for erroneous workflow execution.

In order to attain the above and other objects, according to one aspect, the disclosure provides a non-transitory computer-readable storage medium storing computer-readable instructions. The computer-readable instructions, when executed by a processor, causes the processor to perform a first process and a second process. The first process comprises: (a1) generating first scan data by controlling a scanner connected to the processor; (a2) acquiring a first feature data set indicating features of the generated first scan data, the features of the generated first scan data having different feature types from one another; (a3) selecting one or more of a plurality of target workflow parameter sets in accordance with a selection procedure using the first feature data set as input data of the selection procedure, the selection procedure being based on selection criteria indicated by selection criteria data stored in a memory connected to the processor, each of the target workflow parameter sets being a workflow parameter set included in the selection criteria data as a selection candidate for the selection procedure, the workflow parameter set being a set of workflow parameters; and (a4) executing a first specific process on the generated first scan data, the first specific process being a process according to one of the selected one or more target workflow parameter sets. The second process comprises: (b1) acquiring a first workflow parameter set via an input interface connected to the processor; (b2) generating second scan data by controlling the scanner; (b3) acquiring a second feature data set indicating features of the generated second scan data, the features of the generated second scan data having different feature types from one another; and (b4) updating the selection criteria data to: add the acquired first workflow parameter set to the plurality of target workflow parameter sets; and reflect the acquired second feature data set in the selection criteria data.

BRIEF DESCRIPTION OF THE DRAWINGS

The particular features and advantages of the embodiment(s) as well as other objects will become apparent from the following description taken in connection with the accompanying drawings, in which:

FIG. 16A is a view illustrating an example of an original read by a scanner of the MFP in the system according to the first embodiment; and FIG. 16B is a table illustrating examples of features of scan data generated by the scanner of the MFP in the system according to the first embodiment.

DETAILED DESCRIPTION

Next, embodiments of the present disclosure will be described while referring to the accompanying drawings. Note that it would be apparent to those skilled in the art that the embodiments described below are merely examples of the present disclosure and modifications and variations may be made to the embodiments. For example, the order for executing the processes described below may be appropriately modified.

First Embodiment

Figure 1:
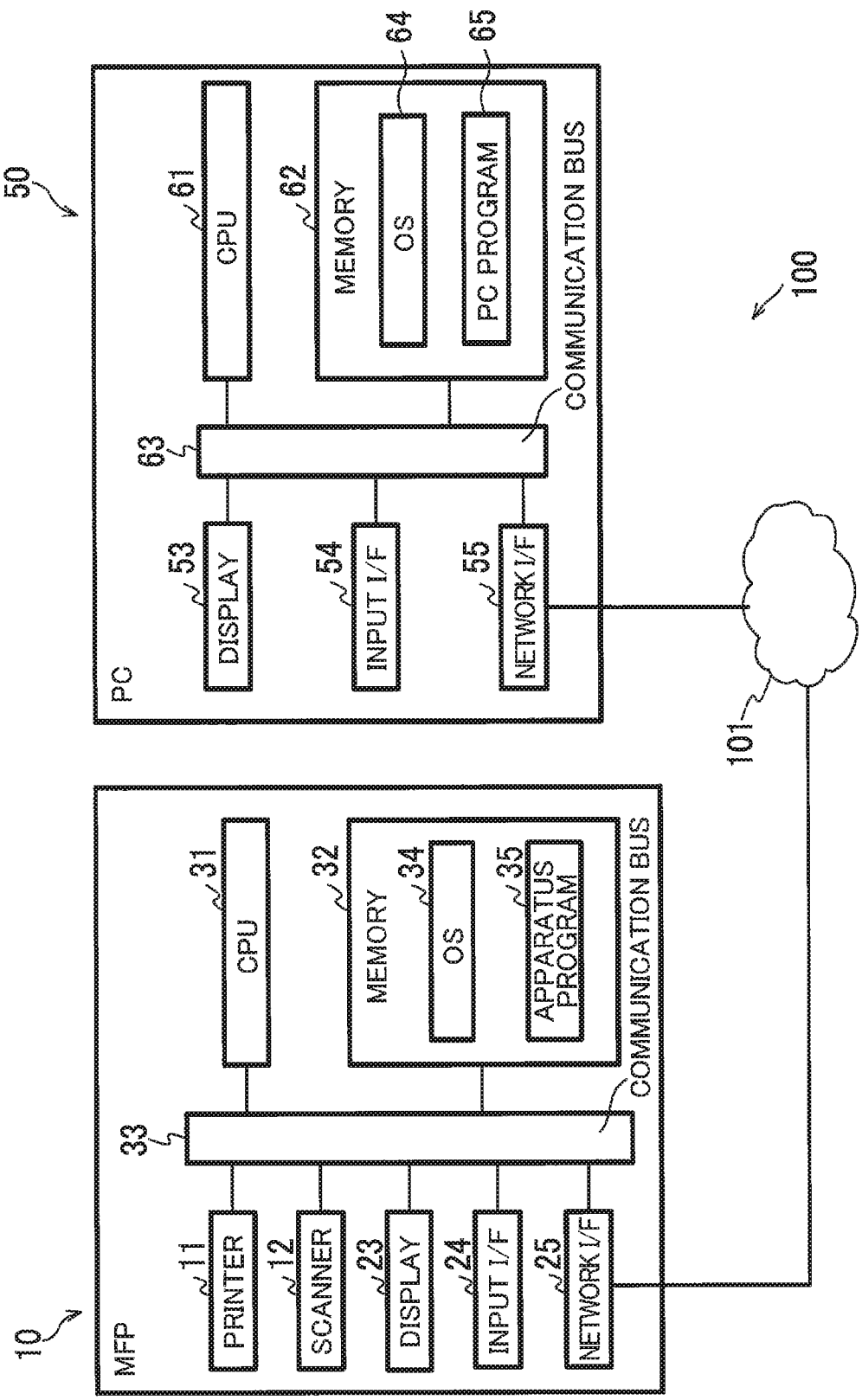
FIG. 1 is a block diagram illustrating a system according to a first embodiment of the present disclosure.

FIG. 1 is a schematic diagram showing a system 100 according to the first embodiment of the present disclosure. The system 100 shown in FIG. 1 includes a multifunction peripheral 10 (hereinafter, abbreviated to "MFP 10"), and a personal computer 50 (hereinafter, abbreviated to "PC 50"). Note that the system 100 may include a single-function scanner in place of the MFP 10.

The MFP 10 and the PC 50 are configured to communicate with each other over a communication network 101. While there are no particular limitations on the configuration of the communication network 101, the communication network 101 may be the Internet, a wired LAN, a wireless LAN, or any combination of these. Alternatively, the MFP 10 and the PC 50 may be connected to each other with a USB cable or the like.

As shown in FIG. 1, the MFP 10 includes a printer 11, a scanner 12, a display 23, an input interface 24, a network interface 25, a CPU 31, a memory 32, and a communication bus 33. The components configuring the MFP 10 are interconnected via the communication bus 33.

The printer 11 executes a print operation for recording on a sheet an image specified by image data. The method of recording employed by the printer 11 may be any well-known method including an inkjet method or an electrophotographic method. Note that the printer 11 may be omitted from the MFP 10.

The scanner 12 executes a scan operation for reading an image recorded on an original and generating image data (hereinafter, referred to "scan data"). The scanner 12 is an example of the claimed "scanner".

The display 23 includes a display screen for displaying various information. The display 23 may be configured of an LCD or an organic EL display, for example.

The input interface 24 is a user interface for receiving (accepting) input operations performed by the user. Specifically, the input interface 24 has buttons and outputs to the CPU 31 various operation signals corresponding to the buttons that have been pressed. The input interface 24 may also have a film-like touchscreen laid over the surface of the display 23.

Examples of user operations include operations for specifying objects displayed on the display 23, and operations for inputting alphabetic, character strings, numeric strings, or any combination of these. Examples of "objects" displayed on the display 23 include character strings, icons, buttons, links, radio buttons, checkboxes, and pull-down menus, and the like.

In the present embodiment, the input interface 24 is implemented as a touchscreen. The input interface 24 outputs position information indicating positions on the display screen that the user touched. In general, the term "touch" in this specification includes any operation for bringing an input medium into contact with the display screen. Further, an action called "hover" or "floating touch" in which the input medium is brought to a position only slightly separated from the display screen while not actually touching the same may also fall under the concept of "touch" described above. Further, the input medium may be the user's finger, a stylus pen, or the like. A user operation of tapping a part of the display 23 corresponding to an object displayed on the display 23 is one example of an input operation for specifying the object. The input interface is an example of the claimed "input interface".

The network interface 25 is an interface for communicating with external apparatuses via the communication network 101. The MFP 10 can transmit various information to external apparatuses via the network interface 25 and receive various information from external apparatuses via the network interface 25. While there is no particular restriction on the specific communication method used by the network interface 25, the network interface 25 may employ Wi-Fi technology (Wi-Fi is a registered trademark), for example. Further, if the MFP 10 and the PC 50 are connected by a USB cable or the like, the network interface 25 may be implemented by a USB interface to which a USB cable is detachably connectable.

The CPU 31 controls the overall operations of the MFP 10. The CPU 31 acquires various programs (described later) from the memory 32 and executes the programs based on various information outputted from the input interface 24, various information received from external apparatuses via the network interface 25, and the like. The CPU 31 is an example of the claimed "processor".

The memory 32 stores an operating system 34 (hereinafter, abbreviated to "OS 34"), an apparatus program 35, and selection criteria data. The apparatus program 35 may be a single program or an aggregate of programs. The memory 32 also stores data, information, and the like required for executing the apparatus program 35. The memory 32 may be configured of RAM, ROM, EEPROM, a hard disk drive, a portable storage medium such as USB memory detachably mounted in the MFP 10, a buffer provided in the CPU 31, or any combination of these, for example. The memory 32 is an example of the claimed "memory" and the apparatus program 35 is an example of the claimed "computer-readable instructions".

The selection criteria data indicates selection criteria used in a selection procedure. The selection criteria data includes a plurality of target workflow parameter sets. The selection procedure is a process of selecting one or more from among the plurality of target workflow parameter sets using the selection criteria data when the input data received is a feature data set of scan data.

The feature data set indicates features (hereinafter, sometimes referred to as "feature set" or "set of features") that are characteristic of the scan data. Features are information that indicates characteristics of the scan data and is acquired by analyzing the scan data.

Examples of features include paper size, RGB values of the base color, a histogram of luminance values, a histogram of edge vectors, characters included in the scan data, the number of the characters, SIFT features, SURF features, and HOG features. A feature may be a numerical value, a set of numerical values, a vector, a set of vectors, a character string, and the like. In the present embodiment, various types of features are acquired from the scan data. That is, in the present embodiment, the features acquired from the scan data have different feature types from one another.

Examples of features acquired from the scan data will be described with reference to FIG. 16. In this example, the scanner 12 reads the original shown in FIG. 16A. The scan data generated by the scanner 12 represents an image having the text "Invoice," "OX Inc.," and the like superposed over a blue base color. By analyzing the scan data in this example, a set of features (a feature set) indicated in FIG. 16B are obtained.

The set of features in FIG. 16B include a feature of type "paper size", a feature of type "base color", a feature of type "the number of characters", and a feature of type "luminance histogram".

In the example of FIG. 16B, the feature type "paper size" is "height: 297 mm, width: 210 mm, A4", the feature type "base color" is "R: 76, G: 172, B: 255, blue", the feature type "the number of characters" is "98", and the feature type "luminance histogram" is the number of pixels for each luminance value.

The number of pixels for each luminance value denotes the number of pixels in the image that have certain luminance values. The number of pixels for each luminance value in the example of FIG. 16B is an aggregate of pixel numbers for each of the luminance values from 0 to 255 and thus is a set of numerical values. FIG. 16B represents the pixel number for each luminance value using a bar graph in which the horizontal axis represents luminance and the vertical axis represents the number of pixels.

A workflow parameter set is a set of workflow parameters for determining the content of a process performed on scan data. Examples of the workflow parameter set include parameters for basic scan settings such as resolution, color/monochrome, single-sided/double-sided, and size; parameters for advanced scan settings such as a drop-out color, ruled line removal, and the like; parameters for image process settings such as an OCR process, barcode reading, and the like; and parameters for settings of the save file format and save location. Target workflow parameter sets are workflow parameter sets that have been registered as candidates for selection in a selection procedure.

Figure 15:
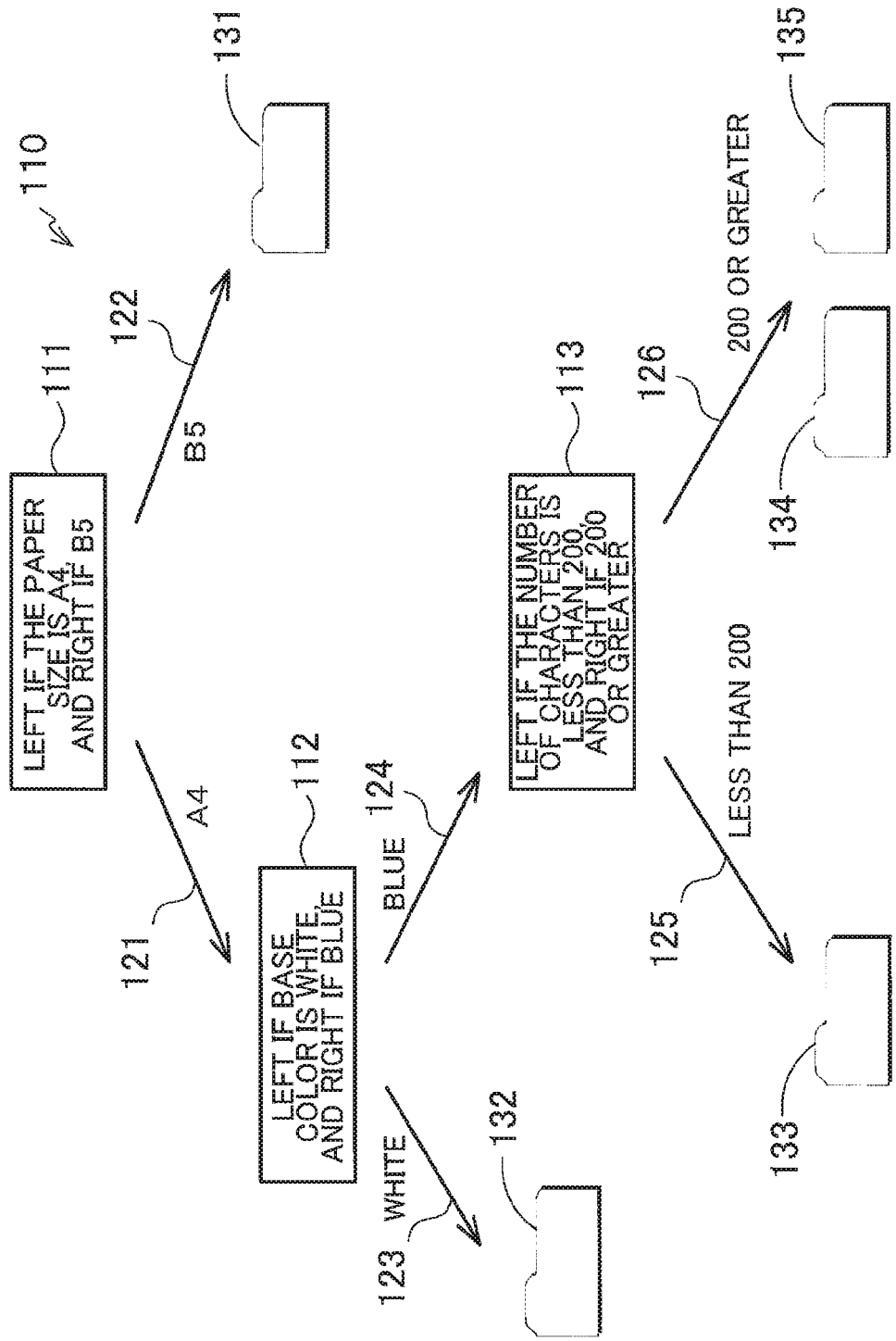
FIG. 15 is an explanatory view explaining a decision tree structure of selection criteria specified by selection criteria data stored in a memory of the MFP in the system according to the first embodiment.

In the present embodiment, the selection criteria indicated by selection criteria data has a decision tree structure. FIG. 15 shows a decision tree structure 110 as an example of the decision tree structure. The decision tree structure 110 has nodes 111 through 113, and links 121 through 126.

Node 111 is the root node. The links connect nodes to nodes or nodes to target workflow parameter sets. A node has a condition indicating which connecting link to select from among the connecting links on the basis of a feature of one feature type. In the decision tree structure 110, the nodes form a hierarchical structure with the root node at the top.

The condition indicated by node 111 is "left if the paper size is A4, and right if B5." The left link 121 is connected to node 112, while the right link 122 connected to a target workflow parameter set 131.

The condition indicated by node 112 is "left if the base color is white, and right if blue." The left link 123 is connected to a target workflow parameter set 132, while the right link 124 is connected to node 113.

The condition indicated by node 113 is "left if the character number is less than 200, and right if 200 or greater." The left link 125 is connected to a target workflow parameter set 133, while the right link 126 is connected to two target workflow parameter sets 134 and 135.

In the selection procedure using the selection criteria specified by the decision tree structure, the process begins from a link selection operation at the root node, and continues by repeating a node transfer operation and a link selection operation until a terminal operation is performed.

The link selection operation is an operation of selecting one of the links connected to the current node by comparing the feature included in the input data with the condition indicated by the current node. The node transfer operation is an operation of performing, when the selected link is connected to another node, the link selection operation for this node. The terminal operation is an operation of selecting, when the selected link is connected to one or more target workflow parameter sets, the one or more target workflow parameter sets. Here, the one or more target workflow parameter sets selected in the terminal operation are determined to be the workflow parameter set matching the selection criteria.

As described above, when a selected link is connected to a plurality of target workflow parameter sets, the plurality of target workflow parameter sets are selected in the terminal operation. In this way, in the selection procedure, a plurality of workflow parameter sets may be selected as the workflow parameter set matching the selection criteria.

In this way, when feature data set of scan data is the input data for the selection procedure, the apparatus program 35 can select and acquire one or more workflow parameter sets from among the plurality of target workflow parameter sets, using a decision tree structure specified by selection criteria indicated by selection criteria data.

The selection criteria data may also include priority data specifying priority. The priority is a ranking specifying that a specific target workflow parameter set should be given priority in the selection procedure. For example, a priority may specify individually whether each of the target workflow parameter sets has priority or may specify the order of priority among the target workflow parameter sets.

When more than one target workflow parameter sets are selected in the selection procedure, one or more of the target workflow parameter sets are selected according to the priority specified in the priority data.

For example, in the decision tree structure 110 of FIG. 15, the link 126 is connected to two target workflow parameter sets 134 and 135. When the priority data specifies that the target workflow parameter set 134 has priority, then the target workflow parameter set 134 is ultimately selected in the selection procedure. When both target workflow parameter sets 134 and 135 have the same priority or When no priority has been specified, then both target workflow parameter sets 134 and 135 may be ultimately selected in the selection procedure.

Selection criteria data is created for each workflow group and stored in the memory 32. A workflow group is a group formed by grouping together a plurality of target workflow parameter sets.

For example, when the system 100 is used by a plurality of workgroups, such as an accounting group and a general affairs group, the user sets up a workflow group for each workgroup as a group of target workflow parameter sets for the corresponding one workgroup. In the selection procedure using the selection criteria indicated by the selection criteria data for a certain workflow group, the target workflow parameter sets belonging to that workflow group become a target for selection (a selection candidate). Note that when no workflow group is set up by the user, selection criteria data is created in which all target workflow parameter sets are a target for selection.

The memory 32 may be a computer-readable storage medium. The computer-readable storage medium is a non-transitory medium. In addition to the above examples, non-transitory media include a recording medium such as CD-ROM, DVD-ROM, and the like. The non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 62 provided in the PC 50 described next.

As shown in FIG. 1, the PC 50 includes a display 53, an input interface 54, a network interface 55, a CPU 61, the memory 62, and a communication bus 63. Since the display 53, input interface 54, network interface 55, CPU 61, memory 62, and communication bus 63 of the PC 50 share the same structure as the display 23, input interface 24, network interface 25, CPU 31, memory 32, and communication bus 33 of the MFP 10, a description of these components will not be repeated. The PC 50 may be a mobile phone, a smartphone, a tablet terminal device, or the like.

Next, the operations of the system 100 according to the present embodiment will be described while referring to FIGS. 2 through 6.

In general, flowcharts in this specification depict processes performed by the CPUs 31 and 61 according to instructions described in programs. In other words, processes such as "determine," "extract," "select," "calculate," "set," "specify", "identify," "control," and the like in the following description represent processes performed by the CPUs 31 and 61. Processes performed by the CPUs 31 and 61 include processes that control hardware through the corresponding OS 34 and OS 64.

Note that, in this specification, the term "acquire" is used under a concept that need not necessarily require a request. That is, a process in which the CPU receives data without issuing a request is included in the concept of "the CPU acquires data." Further, "data" in this specification is expressed in bit strings that a computer can read. Further, data of different formats are treated as the same data when the content of the data is essentially the same. The same holds true for "information" in this specification. Further, processes such as "command," "respond," and "request" are implemented by communicating (e.g., transmitting) information specifying a command, response, request, and the like. Further, terms such as "command," "response," "request," and the like may be used also in the sense of information per se which indicates a command, response, request, and the like.

Further, processes performed by the CPU according to instructions described in a program may be described in abbreviated terms, such as "the CPU 31 executes" or "the apparatus program 35 executes." The same holds true for the CPU 61 and the PC program 65.

Further, a process in which the CPU determines whether information A indicates circumstance B may be described conceptually as "determining whether circumstance B on the basis of information A." A process in which the CPU determines whether information A indicates circumstance B or circumstance C may be described conceptually as "determining whether circumstance B or circumstance C on the basis of information A."

Figure 2:
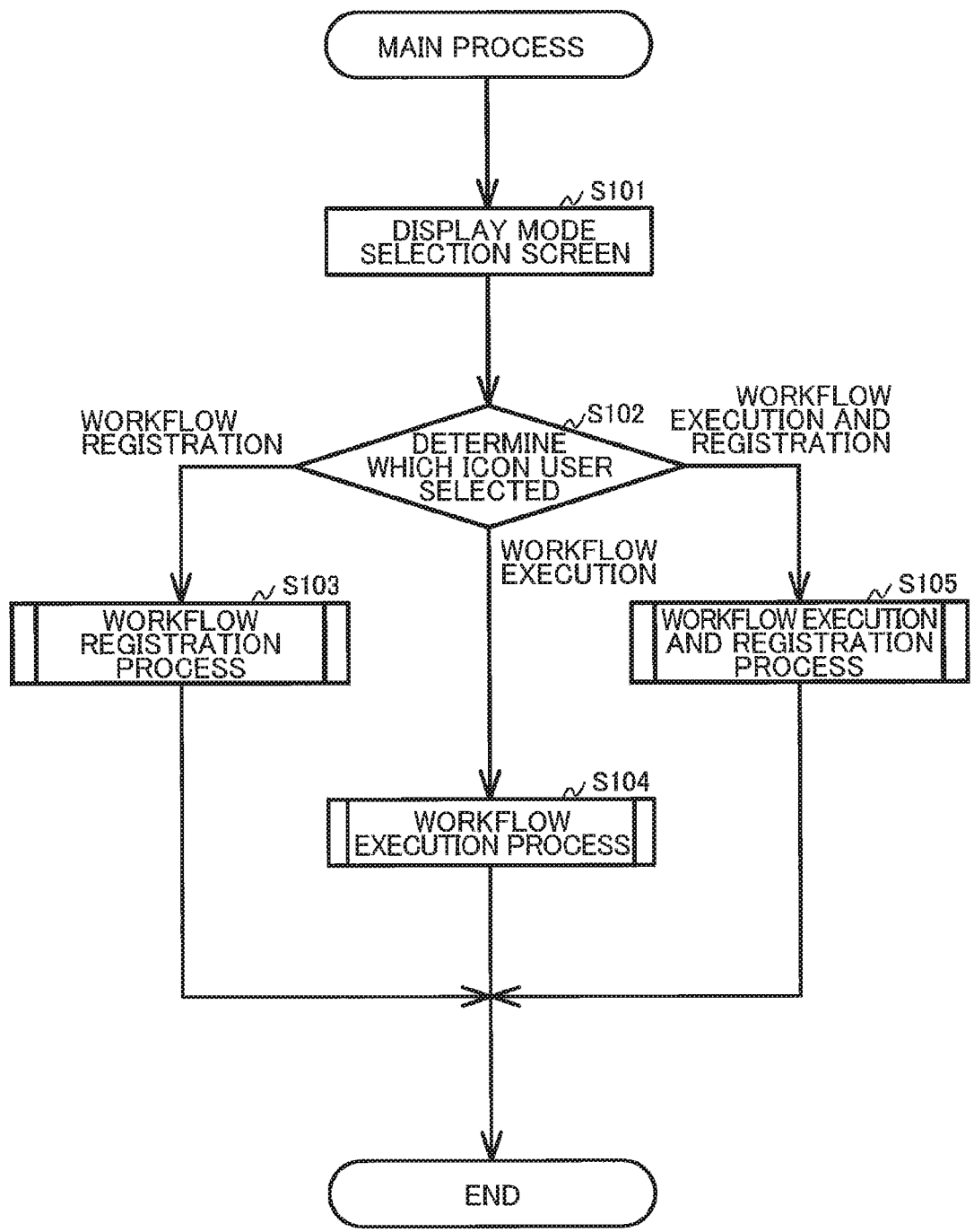
FIG. 2 is a flowchart illustrating steps in a main process executed by a CPU of an MFP in the system according to the first embodiment.
Figure 13A:
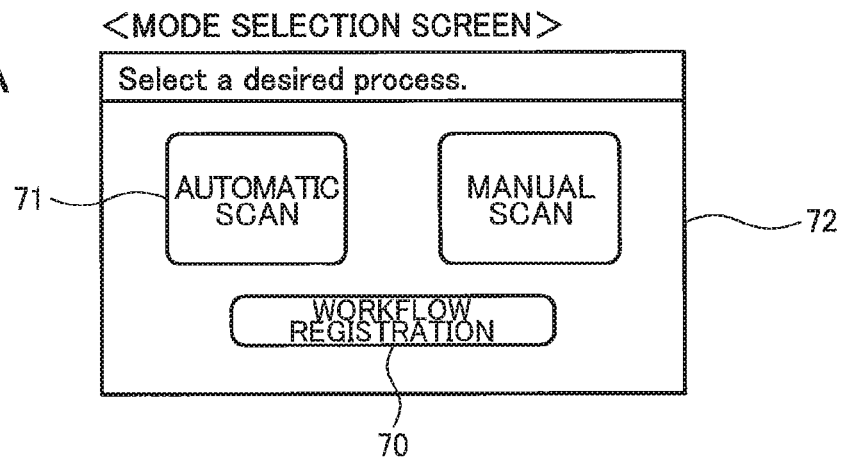
FIG. 13A is a view illustrating a mode selection screen displayed on a display of the MFP in the system according to the first embodiment.

Next, a main process will be described with reference to FIG. 2. When the user starts up the MFP 10, in S101 of the main process the apparatus program 35 of the MFP 10 displays on the display 23 a mode selection screen shown in FIG. 13A. The mode selection screen includes the text "Select a desired process," a Workflow Registration icon 70, an Automatic Scan icon 71, and a Manual Scan icon 72. The apparatus program 35 monitors user's selections of icons.

When the apparatus program 35 determines that the user has selected an icon, in S102 the apparatus program 35 determines which icon the user selected. When the user has selected the Workflow Registration icon 70 (S102: Workflow Registration), in S103 the apparatus program 35 executes a workflow registration process.

The workflow registration process will be described next with reference to FIG. 3. In S201 at the beginning of the workflow registration process, the apparatus program 35 acquires a workflow parameter set (a set of workflow parameters) according to user operations received via the input interface 24.

For example, in S201 the apparatus program 35 may display a workflow-setting input screen (not shown) on the display 23 in place of the mode selection screen and receive input of a workflow parameter set (input of a set of workflow parameters) from the user through pull-down menus and the like.

Upon determining that input of a workflow parameter set has been received, the apparatus program 35 temporarily stores the inputted workflow parameter set in the memory 32.

Note that the apparatus program 35 may also read, from the memory 32, a preset workflow parameter set and display this preset workflow parameter set together with a Select icon on the display 23. In this case, when the user selects the Select icon, the apparatus program 35 temporarily stores this preset workflow parameter set in the memory 32.

In S202 the apparatus program 35 controls the scanner 12 to execute a scanning operation according to a user operation received via the input interface 24. The scanner 12 reads an image recorded on an original set on a contact glass or in an automatic document feeder (ADF) (not shown) and generates scan data representing this image. The apparatus program 35 temporarily stores in the memory 32 the scan data generated by the scanner 12.

The scanning operation of S202 is performed with prescribed settings, regardless of the workflow parameter set acquired in S201. For example, the scanning operation of S202 may be executed with the highest resolution and color settings and the largest paper size setting in the scanner 12.

In S203 the apparatus program 35 analyzes the scan data generated in S202 and acquires feature data set. The apparatus program 35 temporarily stores this feature data set in the memory 32.

In S204 the apparatus program 35 stores in the memory 32 the workflow parameter set (i.e., the workflow parameters) acquired in S201 and the feature data set acquired in S203 in association with each other. More specifically, in S204 the apparatus program 35 updates the selection criteria data stored in the memory 32 so that the selection criteria data includes the workflow parameter set acquired in S201 and the feature data set acquired in S203 in association with each other. By this update of the selection criteria data, the workflow parameter set acquired in S201 is added to the plurality of target workflow parameter sets and the feature data set acquired in S203 is added to a plurality of target feature data sets. A target feature data set is a feature data set associated with a target workflow parameter set. That is, the plurality of target feature data sets are associated with respective ones of the plurality of target workflow parameter sets.

Through the process from S201 to S204 described above, the selection criteria data is updated, so that a workflow parameter set and features (a set of features) indicated by a feature data set are registered in association with each other on the system 100.

In S205 the apparatus program 35 acquires workflow group settings according to user operations received via the input interface 24.

For example, the apparatus program 35 displays a workflow group creation screen (not shown) on the display 23 in place of the workflow-setting input screen and receives, from the user through textboxes in the screen, input of the name of a new workflow group and input of the target workflow parameter sets to be registered (included) in the new workflow group.

Upon determining that input of the workflow group settings is received, the apparatus program 35 stores data indicating the inputted workflow group settings in the memory 32.

In S206 the apparatus program 35 determines whether the user has inputted a command for ending registration via the input interface 24. When a command to end registration has not been inputted (S206: NO), the apparatus program 35 repeats the process in S201-S205. The apparatus program 35 makes the determination in S206 on the basis of whether the user has selected an End Registration icon, for example.

When the apparatus program 35 determines that a command to end registration has been inputted (S206: YES), in S207 the apparatus program 35 performs a process of generating/updating a decision tree. Hereinafter, the process of generating/updating a decision tree will be referred to as "decision tree generation/updating process".

The decision tree generation/updating process is a process of updating selection criteria data so that, when the input data is a feature data set, one or more workflow parameter sets can be selected from among the plurality of target workflow parameter sets by performing the above-described link selection operations, node transfer operations, and terminal operation.

More specifically, the decision tree generation/updating process is a process of: setting the link selection conditions to be indicated by nodes, the connection source of each link, and the connection destination of each link; and constructing a hierarchical structure (i.e., a decision tree structure) for the nodes; and updating the selection criteria data so that the selection criteria data indicates the constructed decision tree structure.

The decision tree structure can be constructed according to a well-known algorithm using the target workflow parameter sets intended for the selection criteria data and the target feature data set associated with these target workflow parameter sets.

When target workflow parameter sets are newly registered on the system 100 in S201-S204, in the decision tree generation/updating process performed in S207, the selection criteria data is updated so that the newly registered target workflow parameter sets become a target for selection (i.e., a selection candidate) in the selection procedure. Further, in the decision tree generation/updating process performed in S207, a decision tree structure is generated and selection criteria data is created for the workflow group created in S205. When the workflow group has been modified in S205, in the decision tree generation/updating process performed in S207, the decision tree structure is modified and the selection criteria data is updated for the modified workflow group.

In S208 the apparatus program 35 displays a priority feature input screen (see FIG. 13B) on the display 23. The priority feature input screen includes the text "Input a feature to be given priority," a feature pull-down menu 73, a Select icon 74, and a Skip icon 75.

The apparatus program 35 receives input in the feature pull-down menu 73, and a selection for the Select icon 74 or Skip icon 75 in the priority feature input screen. In the feature pull-down menu 73 of the example shown in FIG. 13B, "base color" has been selected as the feature (the feature type) to be given priority.

The apparatus program 35 monitors user selections to the icons in the priority feature input screen. When the apparatus program 35 determines that the user has selected the Skip icon 75 (S208: NO), the apparatus program 35 ends the workflow registration process and returns to the main process.

When the apparatus program 35 determines in S208 that the user has selected the Select icon 74 (S208: YES), in S209 the apparatus program 35 acquires the type of feature selected in the feature pull-down menu 73 and temporarily stores this feature type in the memory 32.

In S210 the apparatus program 35 updates the selection criteria data so that the type of feature acquired in S209 is given priority in the selection procedure based on the selection criteria.

Specifically, the apparatus program 35 updates the selection criteria data so that the node having the link selection condition concerning the feature type acquired in S209 is moved to a higher level in the hierarchical structure. In the example of the decision tree structure 110 shown in FIG. 15, the link selection condition indicated by node 112 is a condition concerning the feature type "base color" acquired in S209. In this example, in S210 the apparatus program 35 updates the decision tree so that node 112 is moved to the position of node 111 that is a higher level, that is, so that node 112 becomes the root node.

Subsequently, the apparatus program 35 ends the workflow registration process and returns to the main process.

When the apparatus program 35 determines in S102 of the main process (FIG. 2) that the user has selected the Automatic Scan icon 71 (S102: Workflow Execution), in S104 the apparatus program 35 performs a workflow execution process.

The workflow execution process will be described with reference to FIG. 4. In S301 at the beginning of the workflow execution process, the apparatus program 35 acquires a workflow group designation setting according to user operations received via the input interface 24. A workflow group designation setting is a setting for designating a workflow group to be used in the workflow execution process.

For example, the apparatus program 35 displays a workflow group designation screen (not shown) in place of the mode selection screen (FIG. 13A) on the display 23 and receives input of a workflow group designation setting through a pull-down menu.

When the apparatus program 35 determines that input of a workflow group designation setting has been received, the apparatus program 35 stores data indicating the inputted workflow group designation setting in the memory 32.

In S302 the apparatus program 35 controls the scanner 12 to perform a scanning operation according to user operations received via the input interface 24. The scanner 12 reads the image recorded on an original placed on the contact glass or in the ADF (not shown) and generates scan data representing this image. The apparatus program 35 temporarily stores in the memory 32 the scan data generated by the scanner 12.

The scanning operation in S302 is performed on the basis of prescribed settings. For example, the scanning operation of S302 is executed according to the highest resolution and color settings of the scanner 12 and the largest paper size setting for the scanner 12.

In S303 the apparatus program 35 acquires a feature data set by analyzing the scan data temporarily stored in S302. The apparatus program 35 temporarily stores this feature data set in the memory 32.

Figure 13B:
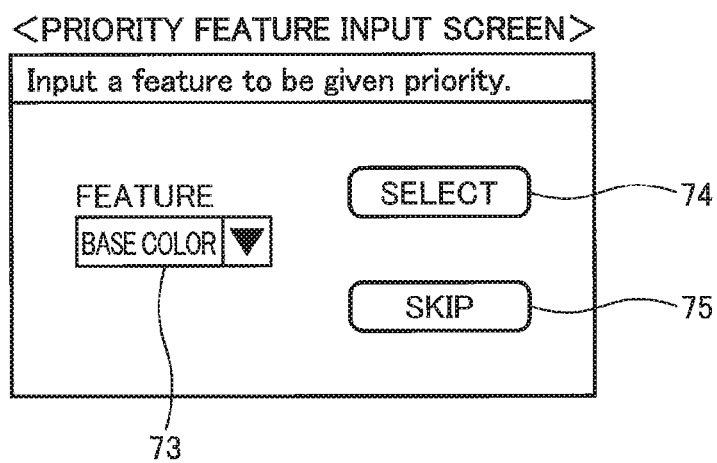
FIG. 13B is a view illustrating a priority feature input screen displayed on the display of the MFP in the system according to the first embodiment.

In S304 the apparatus program 35 displays the priority feature input screen (FIG. 13B) on the display 23 and receives user input in the feature pull-down menu 73 and a selection for the Select icon 74 or Skip icon 75. In the example of FIG. 13B, the feature type "base color" has been selected in the feature pull-down menu 73.

The apparatus program 35 monitors user selections to the icons in the priority feature input screen. When the apparatus program 35 determines that the user has selected the Skip icon 75 (S304: NO), the apparatus program 35 advances to S307 and executes a workflow parameter set selection process.

When the apparatus program 35 determines that the user has selected the Select icon 74 (S304: YES), in S305 the apparatus program 35 acquires the feature type selected in the feature pull-down menu 73 and temporarily stores this feature type in the memory 32.

In S306 the apparatus program 35 updates the selection criteria data so that the feature type acquired in S305 is given priority in the selection procedure based on the selection criteria. Since the process of S306 is identical to the process of S210 in the workflow registration process of FIG. 3, a detailed description of this process will not be repeated.

Next, the apparatus program 35 executes the workflow parameter set selection process of S307.

The workflow parameter set selection process will be described next with reference to FIG. 6. In S501 at the beginning of this process, the apparatus program 35 identifies the selection criteria data to be used for the designated workflow group on the basis of the workflow group designation setting inputted in S301.

In S502, the apparatus program 35 uses the selection criteria indicated by the selection criteria data identified in S501 to execute a selection procedure using the feature data set acquired in S303 as input data of the selection procedure. Here, a case where the feature data set shown in FIG. 16B is inputted in the decision tree structure 110 shown in FIG. 15 will be described in detail as an example.

First, the apparatus program 35 performs a link selection operation for node 111 that is the root node. The condition indicated by node 111 is "left if the paper size is A4, and right if B5." Since the "paper size" feature in FIG. 16B is "height: 297 mm, width: 210 mm, A4," the apparatus program 35 selects the left link 121.

Next, the apparatus program 35 performs a node transfer operation for link 121. Since the link 121 is connected to the node 112, the apparatus program 35 performs a link selection operation for node 112.

The condition indicated by node 112 is "left if the base color is white, and right if blue." Since the "base color" feature in the example of FIG. 16B is "R: 76, G: 172, B: 255, blue," the apparatus program 35 selects the right link 124 in the selection operation for node 112.

Next, the apparatus program 35 performs a node transfer operation on link 124. Since link 124 is connected to node 113, the apparatus program 35 performs a link selection operation on node 113.

Since the condition indicated by node 113 is "left if the character number is less than 200, and right if greater than or equal to 200" and the "number of characters" feature is "98" in this example, the apparatus program 35 selects the left link 125.

Link 125 is connected to the target workflow parameter set 133. Accordingly, the apparatus program 35 performs the terminal operation to select the target workflow parameter set 133 (S503). Specifically, the apparatus program 35 selects, as the workflow parameter set meeting the selection criteria, the target workflow parameter set 133 that is the connection destination of link 125.

The apparatus program 35 subsequently ends the workflow parameter set selection process and returns to the workflow execution process.

In S308 the apparatus program 35 determines the number of workflow parameter sets (i.e., the number of sets of workflow parameters) selected in S307.

Figure 13C:
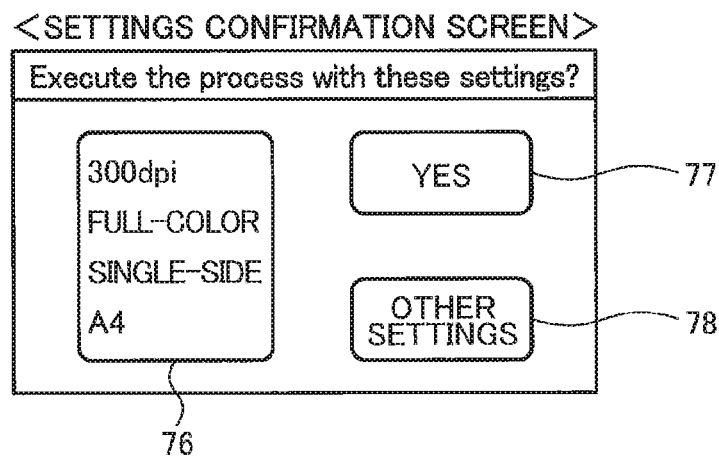
FIG. 13C is a view illustrating a settings confirmation screen displayed on the display of the MFP in the system according to the first embodiment.

When the apparatus program 35 determines that the number of workflow parameter sets selected in S307 is one (1), i.e., that a single workflow parameter set was selected in S307 (S308: single), in S309 the apparatus program 35 displays a settings confirmation screen (see FIG. 13C) on the display 23.

The settings confirmation screen includes the text "Execute the process with these settings?", a text box 76 indicating the content of the target workflow parameter set selected in S307, a Yes icon 77, and an Other Settings icon 78. The apparatus program 35 monitors icon selections performed by the user in the settings confirmation screen.

When the apparatus program 35 determines that the user has selected an icon, in S309 the apparatus program 35 determines which icon the user has selected.

When the apparatus program 35 determines that the user has selected the Yes icon 77 (S309: YES), in S310 the apparatus program 35 performs, according to the workflow parameter set acquired in S307, a process on the scan data generated in S302.

For example, the apparatus program 35 modifies the resolution of the scan data to the resolution specified by the workflow parameter set, creates data in a file format specified by the workflow parameter set, and stores this data in the memory 62 of the PC 50 that is the save location specified by the workflow parameter set.

In S311 the apparatus program 35 updates the selection criteria data used in the process of S307 so that the workflow parameter set acquired in S307 and used in S310 has priority in the selection procedure.

For example, the apparatus program 35 updates priority data included in the selection criteria data such that the priority of the workflow parameter set is changed from "no priority" to "priority." Alternatively, the apparatus program 35 updates the priority data in the selection criteria data such that the order of priority is set higher for the workflow parameter set.

Subsequently, the apparatus program 35 ends the workflow execution process and returns to the main process.

On the other hand, when the apparatus program 35 determines in S308 that two or more workflow parameter sets (i.e., two or more sets of workflow parameters) were selected in S307 (S308: Multiple), in S312 the apparatus program 35 displays a settings selection screen (FIG. 14A) on the display 23.

Figure 14A:
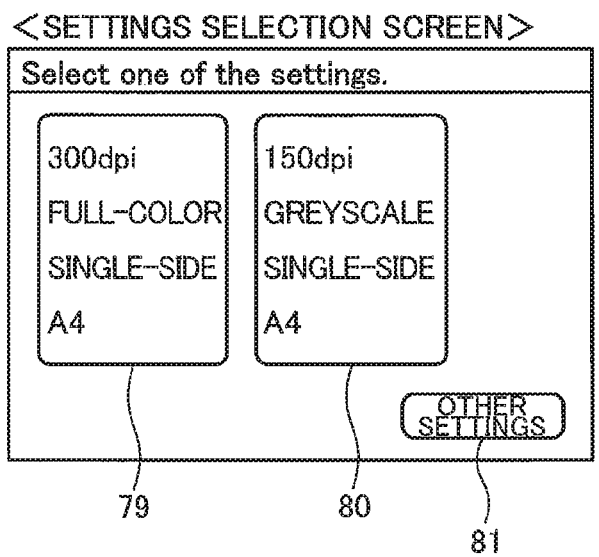
FIG. 14A is a view illustrating a settings selection screen displayed on the display of the MFP in the system according to the first embodiment.

In the example shown in FIG. 14A, the settings selection screen includes the text "Select one of the settings," an icon 79 representing the content of one target workflow parameter set selected in S307, an icon 80 indicating the content of another target workflow parameter set selected in S307, and an Other Settings icon 81.

Note that, in the settings selection screen, the number of icons indicating the contents of the target workflow parameter sets selected in S307 is the same as the number of target workflow parameter sets selected in S307. The settings selection screen shown in FIG. 14A shows a case in which two target workflow parameter sets were selected in the process of S503. When three or more target workflow parameter sets were selected in S503, the settings selection screen may include three or more icons indicating the content of all target workflow parameter sets selected in S503.

In S312 the apparatus program 35 monitors icon selections performed by the user. When the user has selected an icon, in S312 the apparatus program 35 determines which icon the user has selected.

When the apparatus program 35 determines that the user has selected an icon indicating the content of the selected target workflow parameter set (S312: Selection), in S313 the apparatus program 35 performs a process on the scan data generated in S302 according to the workflow parameter set corresponding to the selected icon from among the workflow parameter sets acquired in S307.

For example, the apparatus program 35 modifies the resolution of scan data to the resolution specified by the workflow parameter set, creates data in the file format specified by the workflow parameter set, and stores this data in the memory 62 of the PC 50 specified as the save location by the workflow parameter set.

In S314 the apparatus program 35 updates the selection criteria data used in S307 so that the workflow parameter set acquired in S307 and used in S313 is given priority in the selection procedure. For example, the apparatus program 35 updates the priority data in the selection criteria data such that the priority of the workflow parameter set is changed from "no priority" to "priority." Alternatively, the apparatus program 35 updates the priority data in the selection criteria data such that the order of priority is set higher for the workflow parameter set.

Subsequently, the apparatus program 35 ends the workflow execution process and returns to the main process.

On the other hand, when the apparatus program 35 determines in S309 that the user selected the Other Settings icon 78 (S309: NO) or when the apparatus program 35 determines in S312 that the user selected the Other Settings icon 81 (S312: No selection), in S315 the apparatus program 35 acquires a workflow parameter set (a set of workflow parameters) according to user operations received via the input interface 24.

For example, the apparatus program 35 displays a workflow-setting input screen (not shown) on the display 23 and receives input of a workflow parameter set through pull-down menus and the like. When the apparatus program 35 determines that input for a workflow parameter set has been received, the apparatus program 35 temporarily stores the inputted workflow parameter set in the memory 32.

In S316 the apparatus program 35 performs, according to the workflow parameter set acquired in S315, a process on the scan data generated in S302. For example, the apparatus program 35 modifies the resolution of the scan data to the resolution specified by the workflow parameter set, creates data in the file format specified by the workflow parameter set, and stores this data in the memory 62 of the PC 50 specified as the save location by the workflow parameter set.

Figure 14B:
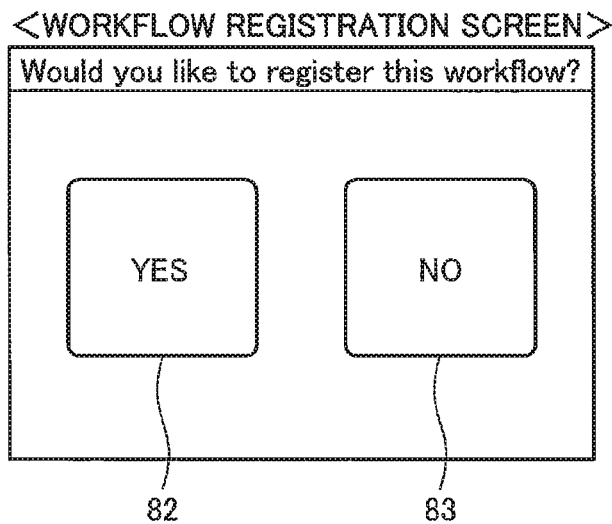
FIG. 14B is a view illustrating a workflow registration screen displayed on the display of the MFP in the system according to the first embodiment.

In S317 the apparatus program 35 displays a workflow registration screen (FIG. 14B) on the display 23. The workflow registration screen includes the text "Would you like to register this workflow?" a Yes icon 82, and a No icon 83. The apparatus program 35 monitors icon selections performed by the user in the workflow registration screen.

When the apparatus program 35 determines that the user has selected an icon, in S317 the apparatus program 35 determines which icon the user has selected. When the apparatus program 35 determines that the user has selected the No icon 83 (S317: NO), the apparatus program 35 ends the workflow execution process and returns to the main process.

On the other hand, when the apparatus program 35 determines that the user has selected the Yes icon 82 (S317: YES), in S318 the apparatus program 35 updates the selection criteria data stored in the memory 32 so that the selection criteria data includes the workflow parameter set acquired in S315 and the feature data set generated in S303 in association with each other. By this update, the workflow parameters set is added to the plurality of target workflow parameter set and the feature data set is added to the plurality of target feature data sets.

In S319 the apparatus program 35 performs a decision tree generation/updating process to update the selection criteria data so that the workflow parameter set added in S318 to the plurality of target workflow parameter sets becomes a selection target (a candidate for selection) in the selection procedure.

Subsequently, the apparatus program 35 ends the workflow execution process and returns to the main process.

When the apparatus program 35 determines in S102 of the main process (FIG. 2) that the user has selected the Manual Scan icon 72 (S102: Workflow Execution and Registration), in S105 the apparatus program 35 performs a workflow execution and registration process.

The workflow execution and registration process will be described next with reference to FIG. 5. In S401 at the beginning of this process, the apparatus program 35 acquires a workflow parameter set according to user operations received via the input interface 24. Since the process in S401 is identical to that in S201 of the workflow registration process (FIG. 3), a detailed description of this process will be omitted.

In S402 the apparatus program 35 displays the workflow registration screen (FIG. 14B) on the display 23. As described above, the workflow registration screen includes the text "Would you like to register this workflow?", the Yes icon 82, and No icon 83. The apparatus program 35 monitors icon selections performed by the user.

When the apparatus program 35 determines that the user has selected an icon, in S402 the apparatus program 35 determines which icon the user has selected and temporarily stores, in the memory 32, data specifying the determination results.

In S403 the apparatus program 35 controls the scanner 12 to perform a scanning operation according to user operations received via the input interface 24. Since the process of S403 is identical to that in S202 of the workflow registration process (FIG. 3), a detailed description of this process will not be repeated.

In S404 the apparatus program 35 executes, on the scan data generated in S403, a process according to the workflow parameter set acquired in S401. Since the process of S404 is identical to that in S310 of the workflow execution process (FIG. 4), a detailed description of this process will not be repeated.

In S405 the apparatus program 35 confirms the determination results in S402. Specifically, when in S405 the apparatus program 35 confirms that it was determined in S402 that the user selected the No icon 83 (S405: Do Not Register), the apparatus program 35 ends the workflow execution and registration process and returns to the main process.

On the other hand, when in S405 the apparatus program 35 confirms that it was determined in S402 that the user selected the Yes icon 82 (S405: Register), in S406 the apparatus program 35 acquires a feature data set by analyzing the scan data temporarily stored in S403. The apparatus program 35 temporarily stores this feature data set in the memory 32.

In S407 the apparatus program 35 updates the selection criteria data stored in the memory 32 so that the selection criteria data includes the workflow parameter set acquired in S401 and the feature data set acquired in S406 in association with each other. By this update, the workflow parameter set is added to the plurality of target workflow parameter sets and the feature data set is added to the plurality of target feature data set.

In S408 the apparatus program 35 acquires workflow group settings according to user operations received via the input interface 24. Since the process in S408 is identical to that in S205 of the workflow registration process (FIG. 3), a detailed description of this process will not be repeated.

In S409 the apparatus program 35 performs the decision tree generation/updating process to update the selection criteria data so that the workflow parameter set added in S407 to the target workflow parameter sets becomes a selection target (a candidate for selection) in the selection procedure.

The process from S410 through S412 is identical to the process from S208 through S210 in the workflow registration process (FIG. 3), and a detailed description of this process will not be repeated.

In the present embodiment, in S307 the apparatus program 35 automatically selects one or more workflow parameter sets (i.e., one or more sets of workflow parameters) that are suited to the scan data generated in S302. Then, in S310 or S313, the apparatus program 35 performs a process on the scan data according to one of the selected one or more workflow parameter sets. Hence, the user can perform processes with the system 100 without having to input a workflow parameter set each time. This has the effect of reducing the time and effort the user must spend on configurations and reduces the chance of an incorrect process being executed.

In the present embodiment, the apparatus program 35 selectively executes the workflow registration process, workflow execution process, and workflow execution and registration process on the basis of a user command. Hence, the user can perform any desired processes on the system 100, thereby enhancing the user-friendliness of the system 100.

In the present embodiment, the apparatus program 35 displays either a settings confirmation screen (FIG. 13C) or a settings selection screen (FIG. 14A) on the display 23 in S309 or S312, respectively, and receives, via the user interface, instructions indicating whether a process should be performed according to one of the automatically selected one or more workflow parameter sets. Hence, the user can control whether or not to use the automatically selected one or more workflow parameter sets, thereby further reducing the chance of an incorrect process being executed.

In the present embodiment, in S311 or S314 the apparatus program 35 updates the selection criteria data so that the workflow parameter set according to which the user instructs to perform a process in S309 or S312 is given priority in the selection procedure. Hence, the workflow parameter set which the user has allowed to be used is given priority in future selections. As a result, this process can further reduce the chance of an incorrect process being executed.

When in S309 or S312 the apparatus program 35 receives a command not to use the automatically selected one or more workflow parameter sets, in the present embodiment the apparatus program 35 acquires a workflow parameter set through the input interface in S315 and performs a process according to the workflow parameter set acquired in S316. Accordingly, when the automatically selected one or more workflow parameter set are different from what the user intended, the user can execute the process using a different workflow parameter set. As a result, this method can further reduce the chance of an incorrect process being executed.

In the present embodiment, a workflow parameter set acquired through the input interface in S315 are added to the target workflow parameter sets and the selection criteria data is updated. Accordingly, the workflow parameter set specified by the user in place of the automatically selected one or more workflow parameter sets becomes the target (the candidate) of future automatic selections. As a result, this process can further reduce the user's time and effort for configurations.

When scan data and a workflow parameter set are acquired (S401 and S403) and registered on the system 100 (S407 and S409), in S404 of the present embodiment the apparatus program 35 executes a process on the scan data using the workflow parameter set acquired in S401. Therefore, the user can register and execute a workflow all at once, thereby further reducing the user's time and effort to perform configurations.

When registering a workflow in the present embodiment, in S210 the apparatus program 35 updates the selection criteria data such that the feature type acquired via the user interface in S209 is given priority in the selection procedure. Specifically, the selection criteria data is updated so that the feature type is moved to a higher level in the hierarchical structure of the decision tree. Accordingly, the type of feature designated by the user is given priority in the selection procedure, thereby improving the precision of automatically selecting one or more workflow parameter sets and further reducing the chance of an incorrect process being executed.

When executing a workflow in the present embodiment, the apparatus program 35 updates the selection criteria data in S306 such that the feature type acquired in S305 via the user interface is given priority in the selection procedure. Specifically, the selection criteria data is updated so that the feature type is moved to a higher level in the hierarchical structure of the decision tree. Accordingly, the type feature designated by the user is given priority in the selection procedure, thereby improving the precision of automatically selecting one or more workflow parameter sets and further reducing the chance of an incorrect process being executed.

Second Embodiment

In the first embodiment described above, the selection criteria indicated by selection criteria data has the decision tree structure. In the second embodiment, the selection criteria is correlated with magnitudes of overall similarities. The structures and processes in the second embodiment, other than those described below, are identical to the structures and processes described in the first embodiment.

In the selection criteria indicated by selection criteria data in the second embodiment, an overall similarity of a target feature set to an input feature set is calculated for each target feature set and one or more target workflow parameter sets associated with the target feature data sets indicating the target feature sets having the greatest overall similarity are selected.

The input feature set is a set of features indicated by a feature data set used as input data in the workflow parameter set selection process of S307. In other words, the input feature set is a set of features indicated by the feature data set acquired in S303. A target feature set is a set of features indicated by a target feature data set included in the selection criteria data.

The overall similarity is a numerical value obtained by totaling individual similarities of the target feature set to the input feature set for the plurality of feature types. The term "totaling" in this description signifies a calculation using the plurality of individual similarities and is used under a concept that includes adding, subtracting, multiplying, dividing, and other computations, as well as a combination of these computations. The selection criteria data includes data indicating the method of calculating the overall similarity.

In the second embodiment, the methods of calculating overall similarity and individual similarity are set such that the numerical values representing overall similarity and individual similarity are greater as the overall similarity of the target feature set to the input feature set is higher. However, the methods of calculating overall similarity and individual similarity may instead be set such that the numerical values for overall similarity and individual similarity are smaller as the overall similarity of the target feature set to the input feature set is higher.

In the present embodiment, a specific numerical value is calculated for each of the feature types and the overall similarity is calculated by totaling the calculated specific numerical values. The specific numerical value for a feature type is calculated by multiplying the individual similarity for the feature type by a weighting factor corresponding to the feature type.

The weighting factor is a coefficient that represents a weight given to each feature type when calculating the overall similarity. The selection criteria data includes weighting factor data representing these weighting factors. Note that a method of calculating the overall similarity may be implemented without using weighting factors.

The individual similarity is a numerical value specifying the degree at which a feature of one type included in the input feature set is similar to a feature of the same type in the target feature set. The method of calculating individual similarity is included, for each of the feature types, in the selection criteria identified by the selection criteria data. In other words, the selection criteria data includes data indicating the method of calculating individual similarity.

Next, a method of calculating overall similarity will be described in greater detail. In the following example, the input feature set and the target feature set include features of three types that will be called type 1, type 2, and type 3 features. For example, the type 1 feature may be "paper size," the type 2 feature may be "base color," and the type 3 feature may be "character number." Specifically, in an input feature set Q, the type 1 feature will be expressed as Q1 (A4, for example), the type 2 feature will be expressed as Q2 (blue, for example), and the type 3 feature will be expressed as Q3 (98 characters, for example). The selection criteria data in this example will include three target feature sets that will be called a target feature set X, a target feature set Y, and a target feature set Z. In the target feature set X, X1 will represent a type 1 feature, X2 a type 2 feature, and X3 a type 3 feature. The target feature sets Y and Z are represented with similar notation.

An overall similarity S(X) of the target feature set X to the input feature set Q is calculated as follows. First, the individual similarities of the target feature set X to the input feature set Q are calculated for the type 1, type 2, and type 3 features. Hereinafter, D(X, 1) will represent an individual similarity of the target feature set X to the input feature set Q for the type 1 feature, D(X, 2) for the type 2 feature, and D(X, 3) for the type 3 feature. The individual similarities of the target feature sets Y and Z for the type 1, type 2, and type 3 features are represented with similar notation.

For example, the individual similarity for type "paper size" is established through calculations using height, width, area, and the like. As an example, the individual similarity for type "paper size" could be set to the inverse of the difference in area.

The individual similarity for type "base color" could be set to the inverse of distance in the L*a*b* color space or CIEDE2000.

The individual similarity for type "character number" could be set to the inverse of the difference in the number of characters.

Note that the individual similarity may be normalized for each feature type or may be normalized to achieve the same scale between different feature types.

The overall similarity is obtained by multiplying each calculated individual similarity by the corresponding weighting factor and adding all results. Here, the weight factor for a type 1 feature will be expressed as a, the weight factor for a type 2 feature will be expressed as b, and the weight factor for a type 3 feature will be expressed as c. The overall similarity (S(X)) of the target feature set X, the overall similarity (S(Y)) of the target feature set Y, and the overall similarity (S(Z)) of the target feature set Z are calculated using the following equations 1 through 3.

$$S(X)=a \times D(X,1)+b \times D(X,2)+c \times D(X,3) \quad \text{Eq. 1:}$$

$$S(Y)=a \times D(Y,1)+b \times D(Y,2)+c \times D(Y,3) \quad \text{Eq. 2:}$$

$$S(Z)=a \times D(Z,1)+b \times D(Z,2)+c \times D(Z,3) \quad \text{Eq. 3:}$$

The magnitudes of the calculated overall similarities are compared to each other, and the target workflow parameter set associated with the target feature data set indicating the target feature set whose overall similarity has the largest value is selected as the results of the selection procedure.

When there are two or more target feature sets whose overall similarity has the largest value, a plurality of target workflow parameter sets corresponding to these target feature sets may be selected as the result of the selection procedure.

When there are two or more target feature sets whose overall similarity has the largest value, selection criteria may be established such that, according to the priority specified by the priority data, one or more target workflow parameter sets are selected from among the target workflow parameter sets corresponding to the two or more target feature sets.

The selection criteria may be configured such that a target workflow parameter set is not selected when the largest value of the overall similarities is smaller than a prescribed threshold. In this case, the result of the selection procedure is "no selection." This method can prevent an unsuitable workflow parameter set from being selected.

By using the selection criteria data indicating the selection criteria described above, the apparatus program 35 can execute a selection procedure that takes a feature data set of scan data as input data, and can select and acquire one or more workflow parameter sets from among a plurality of target workflow parameter sets.

Figure 3:
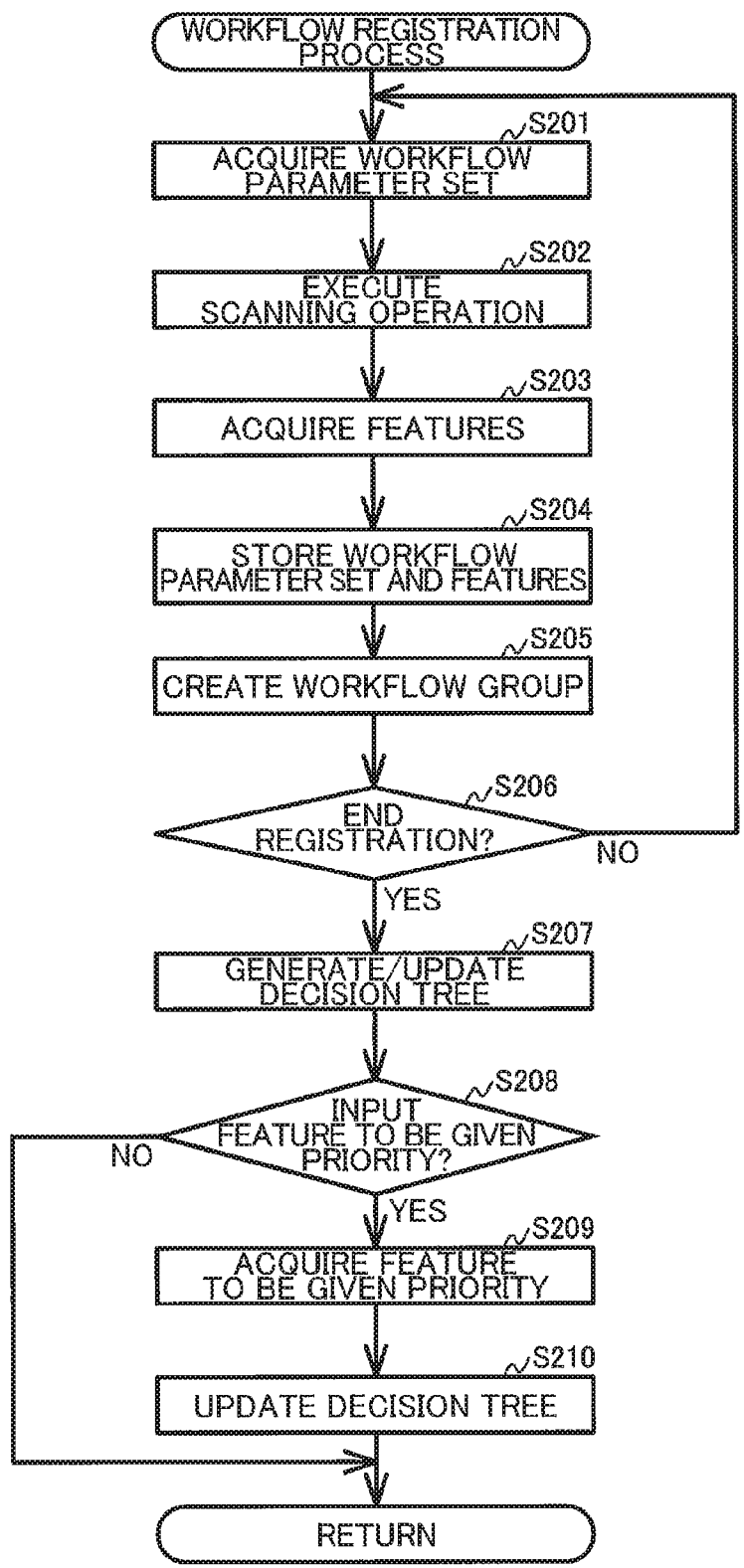
FIG. 3 is a flowchart illustrating steps in a workflow registration process executed by the CPU of the MFP in the system according to the first embodiment.
Figure 7:
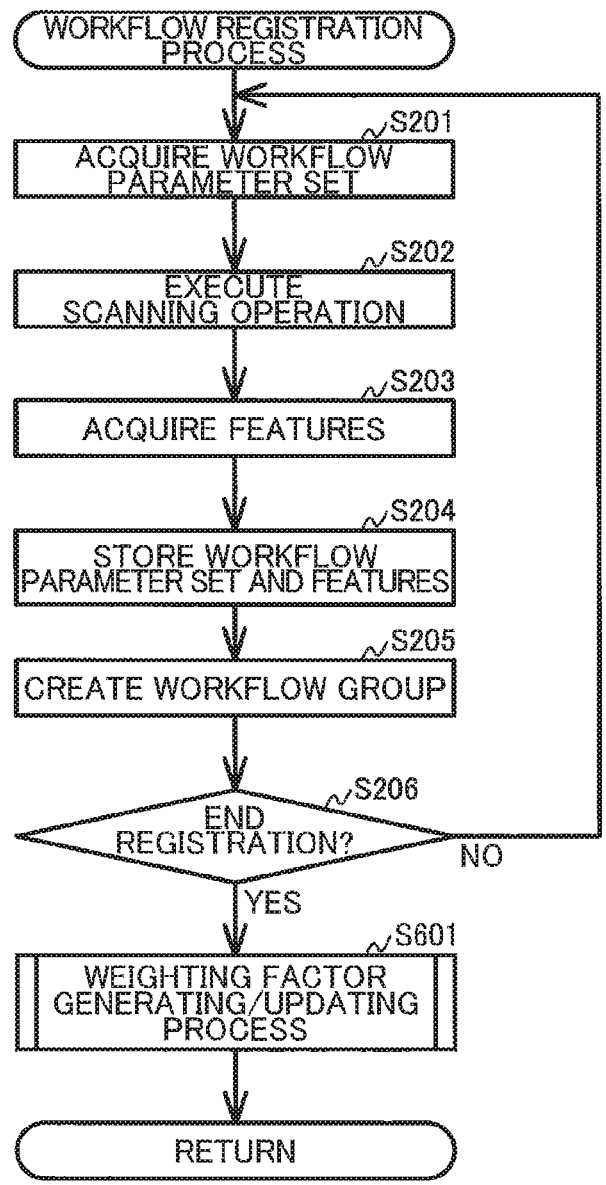
FIG. 7 is a flowchart illustrating steps in a workflow registration process executed by a CPU of an MFP in a system according to a second embodiment.

In the second embodiment, the apparatus program 35 executes the workflow registration process shown in FIG. 7 in place of the workflow registration process according to the first embodiment shown in FIG. 3. In the following description, steps in the workflow registration process shown in FIG. 7 that are identical to those in FIG. 3 are designated with the same step numbers to avoid duplicating description.

When the apparatus program 35 determines in S206 that a command to end registration was inputted (S206: YES), in S601 the apparatus program 35 performs a weighting factor generating/updating process.

The weighting factor generating/updating process will be described next with reference to FIG. 10. In S901 at the beginning of this process, the apparatus program 35 identifies the selection criteria data to be updated. Here, "selection criteria data to be updated" denotes selection criteria data to which a target workflow parameter set was added in S204, or selection criteria data that was created or updated by creating or modifying a workflow group in S205.

Next, the apparatus program 35 compares the content of the target workflow parameter sets included in the selection criteria data identified in S901 with one another to identify target workflow parameter sets having the same content. In S902 the apparatus program 35 creates an aggregate of target feature data sets associated with these target workflow parameter sets and temporarily stores this aggregate of target feature data sets in the memory 32.

In S903 the apparatus program 35 calculates the dispersion (hereinafter, referred to as "feature dispersion") in features indicated by the target feature data sets in the aggregate created in S902 for each feature type and temporarily stores these dispersions in the memory 32.

The feature dispersion is the degree of variability in features of a certain type in the aggregate. The feature dispersion may be the difference between the maximum and minimum values of features of a certain type in the aggregate, the variance of features of a certain type, or the standard deviation of features of a certain type, for example. The feature dispersion may be set smaller when the aggregate includes a larger number of target feature data sets indicating the same features. The selection criteria data includes data specifying the method of calculating the feature dispersion.

The process in S903 will be described here in greater detail using the above example. In this example, the aggregate of target feature data sets includes three target feature data sets: a target feature data set indicating a target feature set X, a target feature data set indicating a target feature set Y, and a target feature data set indicating a target feature set Z. In the target feature set X, X1 represents a type 1 feature, X2 a type 2 feature, and X3 a type three feature. The target features Y and Z are expressed similarly. For the type 1 feature, the apparatus program 35 calculates the feature dispersion among the feature X1 in the target feature set X, the feature Y1 in the target feature set Y, and the feature Z1 in the target feature set Z. The apparatus program 35 similarly calculates the feature dispersion of the type 2 and type 3 features. The following is the method of calculating the feature dispersion.

For example, the feature dispersion of the type "paper size" is calculated as the difference between the maximum area and minimum area of the paper in the features X1, Y1, and Z1. The feature dispersion for the type "paper size" may be calculated as "1" when the features X1, Y1, and Z1 are the same size of paper (A4, for example), "2" when the features X1, Y1, and Z1 include two sizes of paper, and "3" when the features X1, Y1, and Z1 include three sizes of paper.

The feature dispersion for the type "base color" may be calculated as the difference between the maximum and minimum values of distance (distance in the $L^*a^*b^*$ color space or CIEDE2000) among each color in the features X1, Y1, and Z1. For example, the feature dispersion of the type "base color" may be calculated as "1" when the features X1, Y1, and Z1 have the same color (blue, for example), "2" when the features X1, Y1, and Z1 include two colors, and "3" when the features X1, Y1, and Z1 include three colors.

The feature dispersion of the type "the number of characters" may be calculated as the difference between the maximum and minimum values in the features X1, Y1, and Z1.

In S904 the apparatus program 35 determines whether the feature dispersions have been calculated for all of the aggregates created in S902. When determining that the feature dispersions have been calculated for all of the aggregates created in S902 (S904: YES), the apparatus program 35 advances to S905. On the other hands, when determining that the feature dispersions have not been calculated for all of the aggregates created in S902 (S904: NO), the apparatus program 35 continues to repeat the process of S903 and S904 until the feature dispersions have been calculated for all of the created aggregates.

In S905 the apparatus program 35 updates the selection criteria data identified in S901 so that the feature type having the lowest dispersion of the dispersions calculated in S903 is given priority in the selection procedure. Specifically, the apparatus program 35 updates the weighting factor data included in the selection criteria data so that features having lower dispersion are assigned a larger weighting factor.

Using the example described above, the apparatus program 35 compares the dispersion of type 1 features, the dispersion of type 2 features, and the dispersion of type 3 features with one another, increases the weighting factor of the feature type having the smallest dispersion (a 10% increase, for example), and updates the weighting factor data. Next, the apparatus program 35 increases the weighting factor for the feature type having the second smallest dispersion (an increase of 5%, for example), and updates the weighting factor data. Note that, the weighting factor may be similarly increased for the feature types having the third or higher degree of dispersion.

In S906 the apparatus program 35 determines whether the weighting factor data has been updated for all of the aggregates created in S902. When determining that the weighting factor data has been calculated for all of the aggregates created in S902 (S906: YES), the apparatus program 35 advances to S907. On the other hands, when determining that the weighting factor data has not been updated for all of the aggregates created in S902 (S904: NO), the apparatus program 35 continues to repeat the process from S901 to S906 until the weighting factor data has been updated for all of the created aggregates.

In S907 the apparatus program 35 determines whether all selection criteria data to be updated has been updated. When there remain selection criteria data to be updated (S907: NO), the apparatus program 35 returns to S901 and repeats the above process. On the other hand, when all selection criteria data has been updated (S907: YES), the apparatus program 35 ends the weighting factor generating/updating process.

Figure 4:
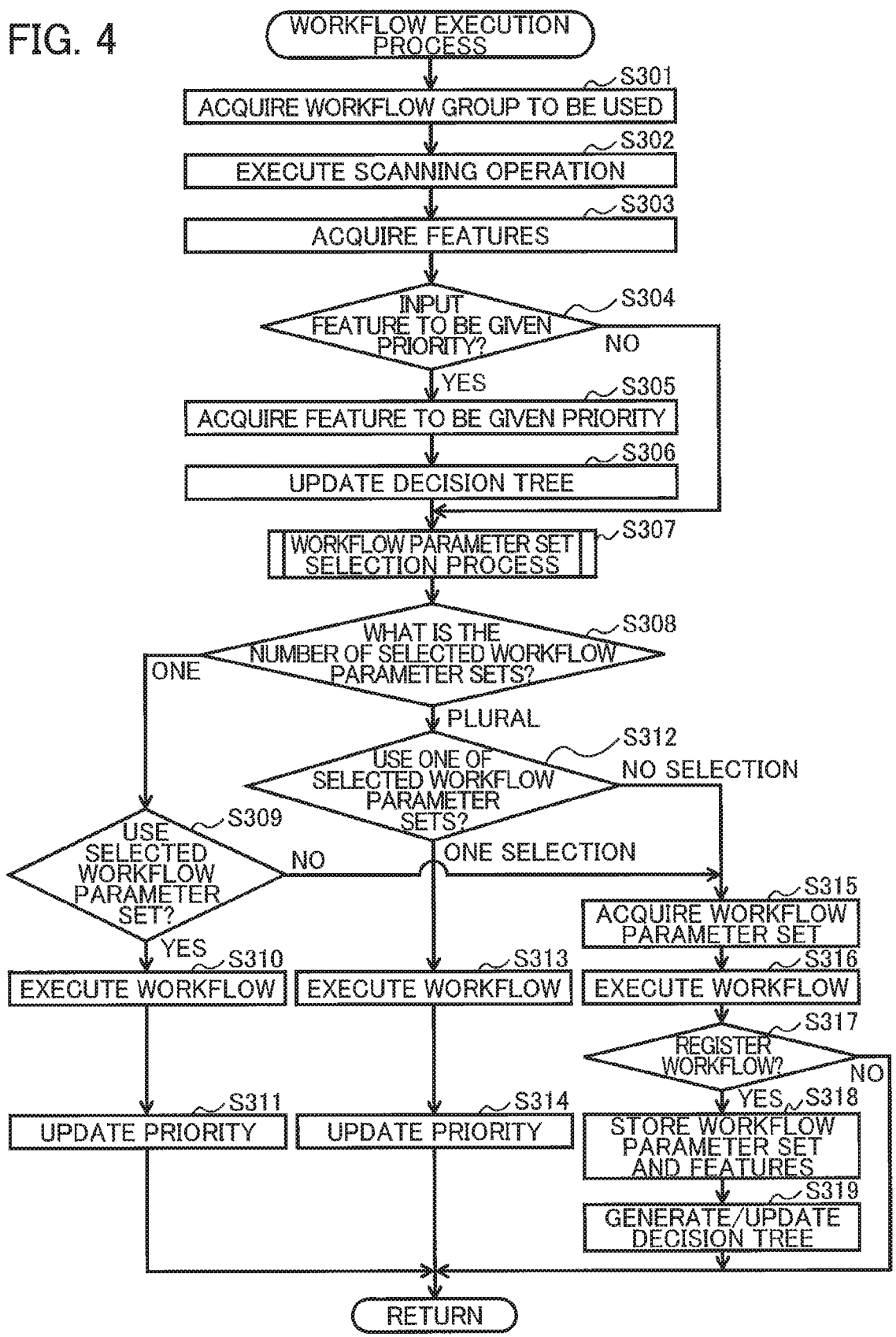
FIG. 4 is a flowchart illustrating steps in a workflow execution process executed by the CPU of the MFP in the system according to the first embodiment.
Figure 8:
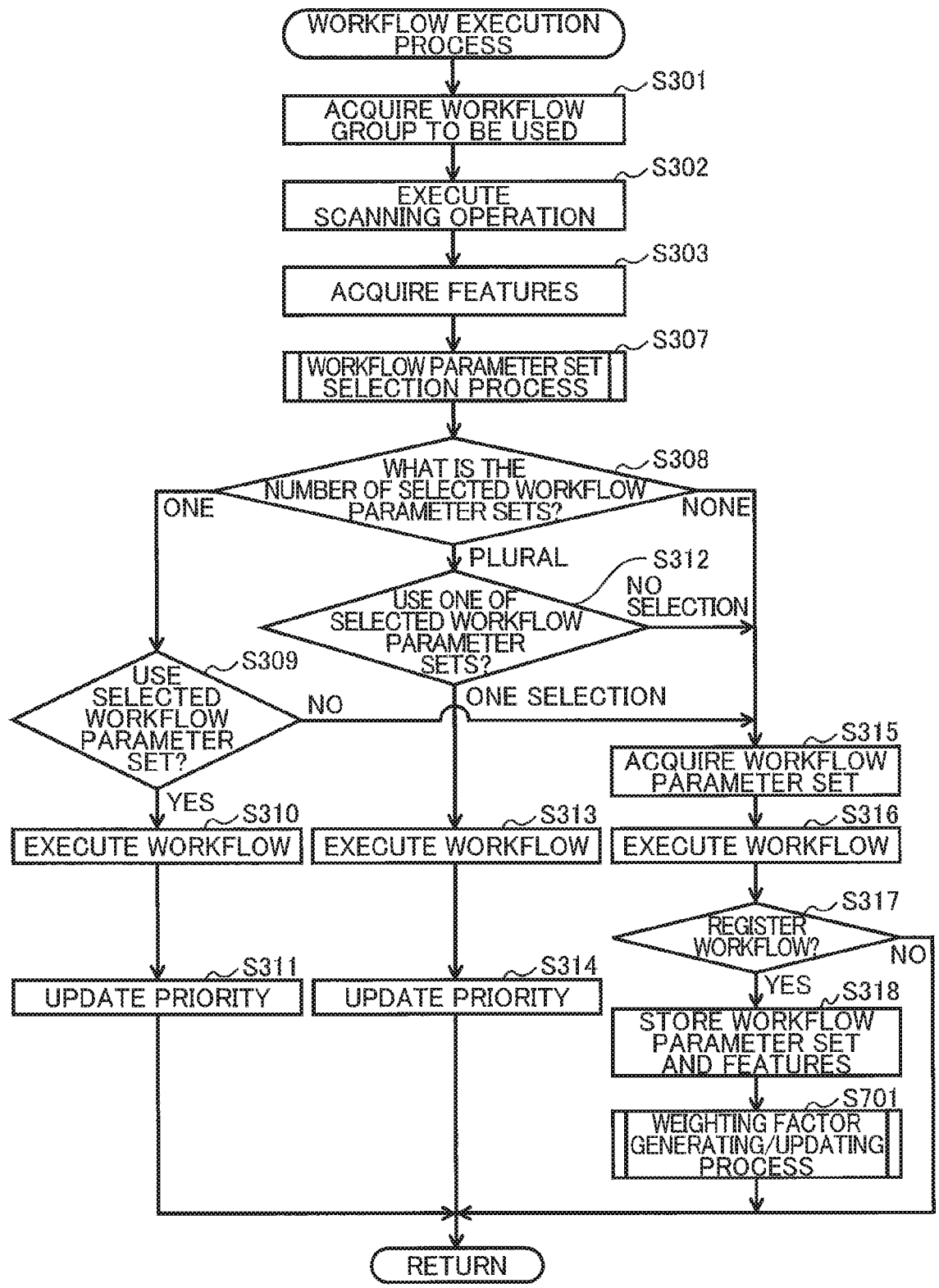
FIG. 8 is a flowchart illustrating steps in a workflow execution process executed by the CPU of the MFP in the system according to the second embodiment.

In the second embodiment, the apparatus program 35 executes the workflow execution process shown in FIG. 8 in place of the workflow execution process of the first embodiment shown in FIG. 4. Note that steps in the workflow execution process of FIG. 8 that are identical to those in FIG. 4 are designated with the same step numbers to avoid duplicating description.

When the apparatus program 35 determines in S309 that the user selected the Other Settings icon 78 (S309: NO) or when the apparatus program 35 determines in S312 that the user selected the Other Settings icon 81 (S312: No Selection) or when the apparatus program 35 determines in S308 that the number of target workflow parameter sets selected in S307 is zero (S308: None), in S315 the apparatus program 35 acquires a workflow parameter set according to user operations received via the input interface 24.

After completing the process in S318, in S701 the apparatus program 35 performs the weighting factor generating/updating process. Since the process of S701 is identical to that of S601 described above, a description of this process will be omitted.

Figure 5:
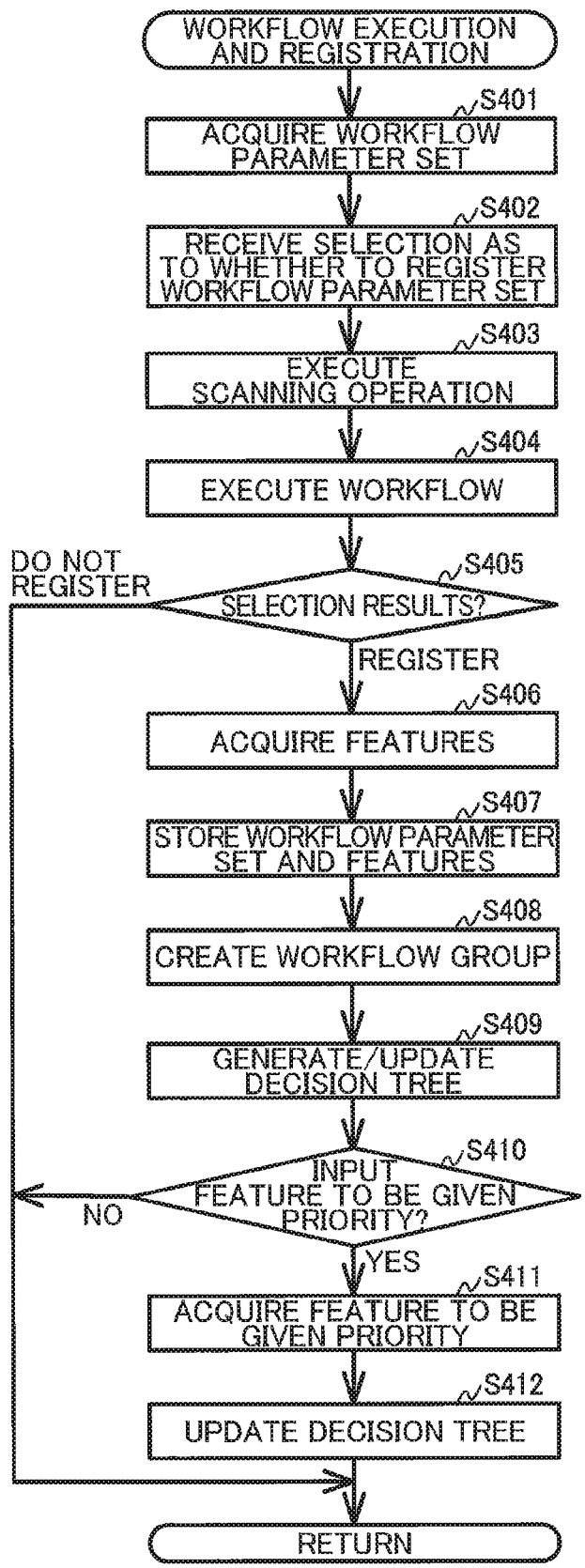
FIG. 5 is a flowchart illustrating steps in a workflow execution and registration process executed by the CPU of the MFP in the system according to the first embodiment.
Figure 9:
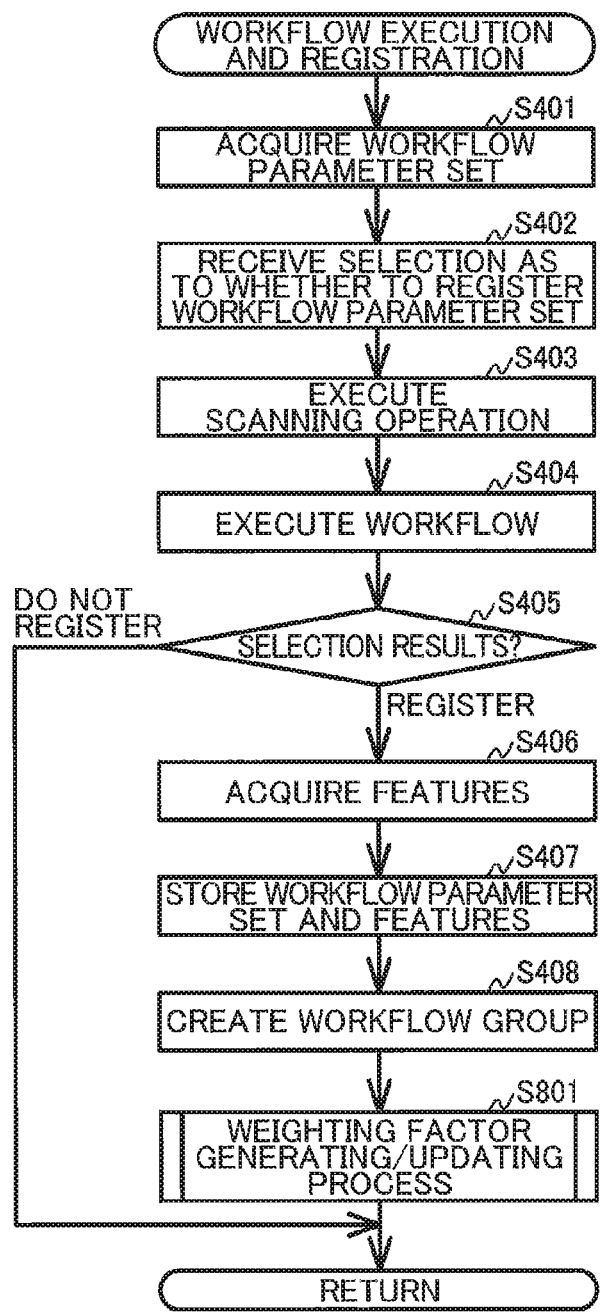
FIG. 9 is a flowchart illustrating steps in a workflow execution and registration process executed by the CPU of the MFP in the system according to the second embodiment.

In the second embodiment, the apparatus program 35 executes the workflow execution and registration process shown in FIG. 9 in place of the workflow execution and registration process according to the first embodiment shown in FIG. 5. Steps in the workflow execution and registration process in FIG. 9 that are identical to those in FIG. 5 are designated with the same step numbers to avoid duplicating description.

After completing the process in S408, in S801 the apparatus program 35 performs the weighting factor generating/updating process. Since the process of S801 is identical to that of S601 described above, a description of this process will be omitted.

Figure 6:
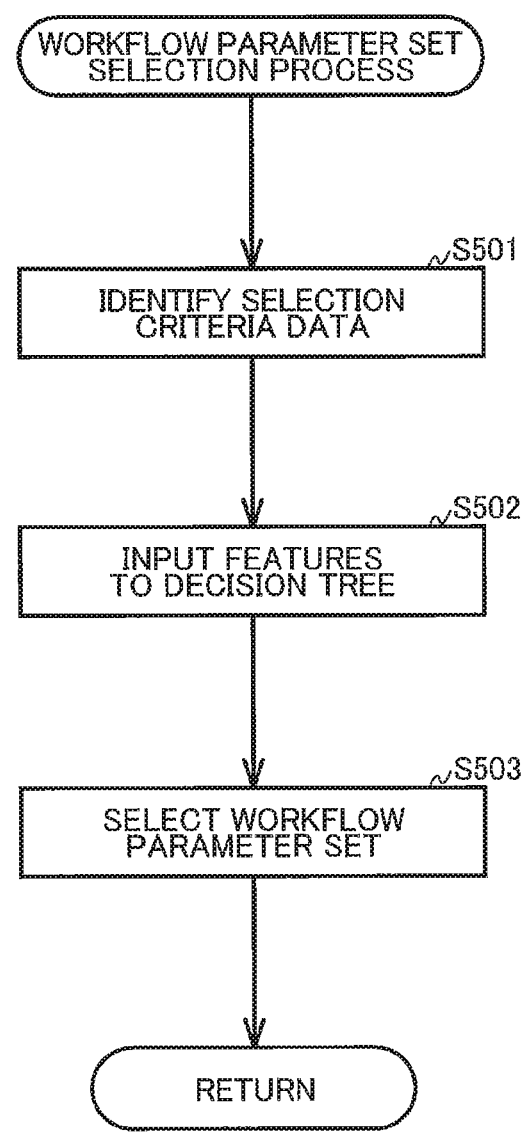
FIG. 6 is a flowchart illustrating steps in a workflow parameter set selection process executed by the CPU of the MFP in the system according to the first embodiment.
Figure 11:
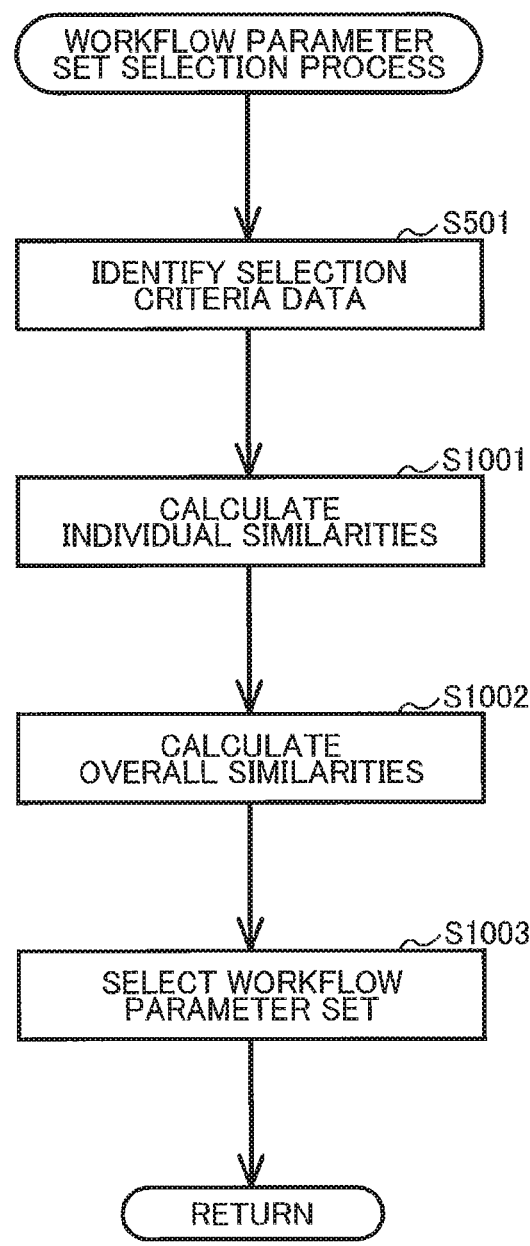
FIG. 11 is a flowchart illustrating steps in a workflow parameter set selection process executed by the CPU of the MFP in the system according to the second embodiment.

In the second embodiment, the apparatus program 35 executes a workflow parameter set selection process shown in FIG. 11 in place of the workflow parameter set selection process of the first embodiment shown in FIG. 6. Steps in the workflow parameter set selection process of FIG. 11 that are identical to those in FIG. 6 are designated with the same step numbers to avoid duplicating description.

The apparatus program 35 uses the selection criteria indicated by the selection criteria data identified in S501 to execute the selection procedure (S1001, S1002, and S1003), wherein the feature data set acquired in S303 is used as input data.

In S1001, on the basis of the method of calculating individual similarities indicated by data included in the selection criteria data acquired in S501, the apparatus program 35 calculates, for each of the target feature sets indicated by the target feature data sets included in the selection criteria data, the individual similarity of the target feature set to an input feature set indicated by the input data set for each of the feature types. Then, in S1001, the apparatus program 35 temporarily stores these calculated individual similarities in the memory 32.

In S1002, on the basis of the method of calculating overall similarities indicated by data included in the selection criteria data identified in S501, the apparatus program 35 calculates, for each of the target feature sets indicated by the target feature data sets included in the selection criteria data, the overall similarity of the target feature set to the input feature set indicated in the input data using the weighting factors specified in the weighting factor data included in the selection criteria data and the individual similarities calculated in S1001. Then, in S1002, the apparatus program 35 temporarily stores these overall similarities in the memory 32.

In S1003 the apparatus program 35 compares the magnitudes of the overall similarities calculated in S1002 and selects, as the result of the selection procedure, the target workflow parameter set associated with the target feature data set indicating the target feature set having the largest overall similarity. Here, the apparatus program 35 may select more than one target workflow parameter set or none.

After completing the workflow parameter set selection process, the apparatus program 35 returns to the workflow execution process.

The feature (the feature type) having the smallest dispersion in the aggregate can be said to represent the characteristics of the aggregate well. In the process of S905 according to the second embodiment, the apparatus program 35 updates the selection criteria data so that the weighting factor is greater for smaller feature dispersions. Accordingly, the feature types having small feature dispersions are given priority in the selection procedure, thereby improving precision in the automatic selection of workflow parameter set and further reducing the chance of an incorrect process being executed.

Variation of the Second Embodiment

In the second embodiment described above, the weighting factors are updated based on the feature dispersions. In this variation, the weighting factors are updated based on the distribution range of features. The structures and processes in this variation, other than those described below, are identical to the structures and processes described in the second embodiment.

Figure 10:
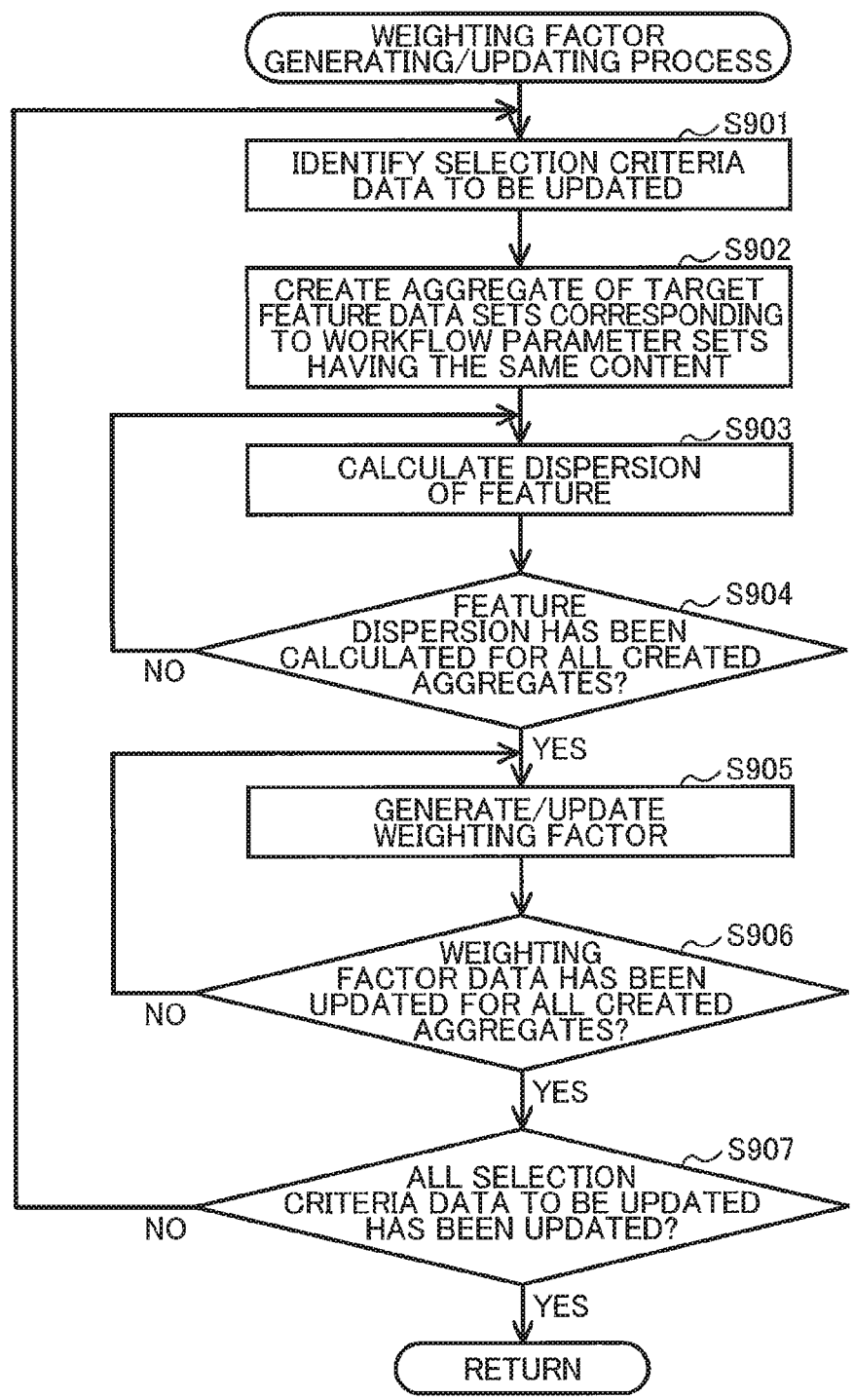
FIG. 10 is a weighting factor generating/updating process executed by the CPU of the MFP in the system according to the second embodiment.
Figure 12:
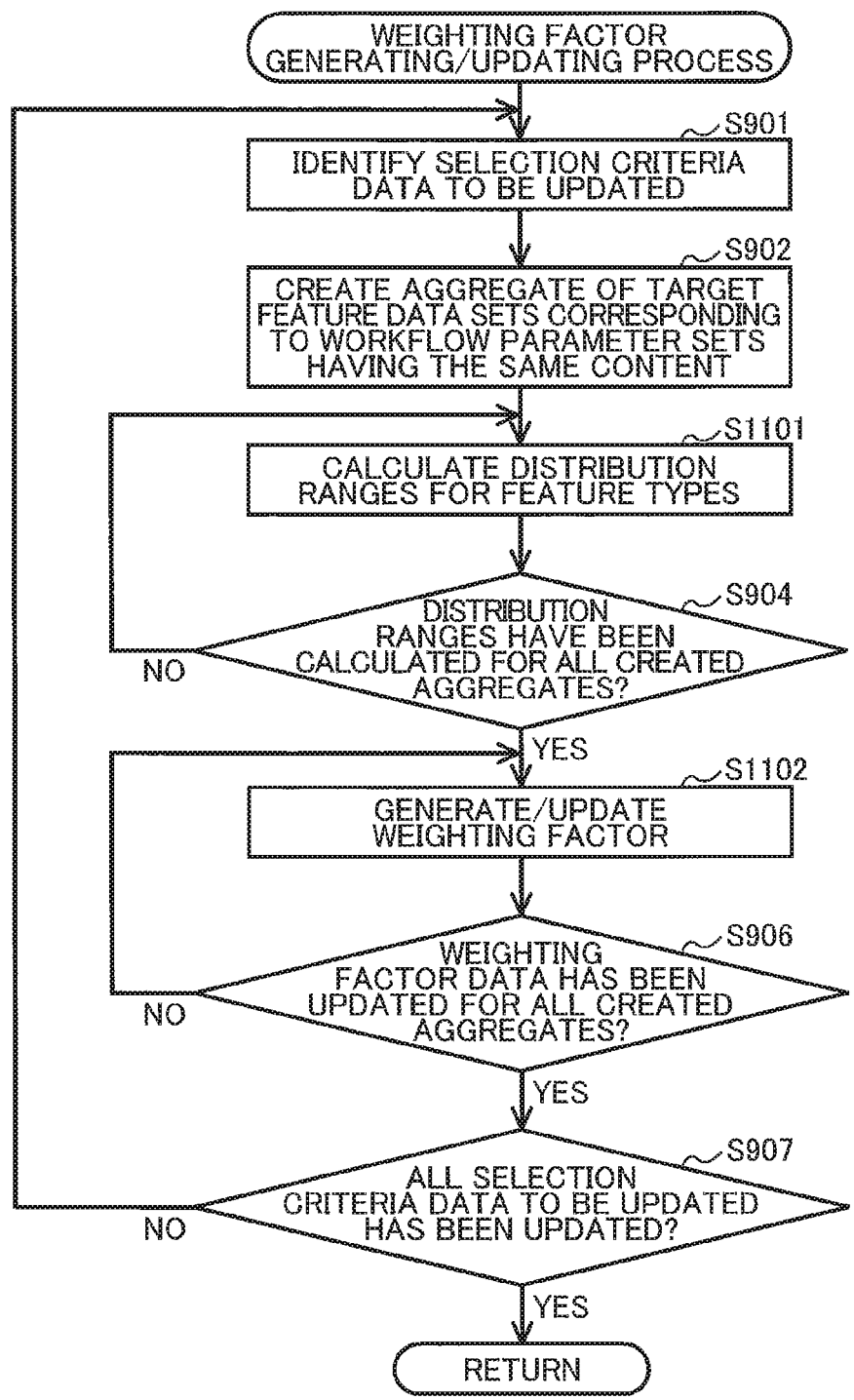
FIG. 12 is a weighting factor generating/updating process executed by a CPU of an MFP in a system according to a variation of the second embodiment.

In the variation of the second embodiment, the apparatus program 35 executes a weighting factor generating/updating process shown in FIG. 12 in place of the weighting factor generating/updating process described in the second embodiment with reference to FIG. 10. Steps in the weighting factor generating/updating process in FIG. 12 that are identical to those in FIG. 10 are designated with the same step numbers to avoid duplicating description.

In S1101 the apparatus program 35 calculates the distribution range for features indicated by the feature data set in each of the aggregates created in S902 and temporarily stores these distribution ranges in the memory 32. The distribution range of features is the range of distribution for features of a certain type in the aggregate. The distribution range of features may be the range from the maximum value to the minimum value of the features expressed as numerical values, for example. The selection criteria data includes data indicating the method of calculating the distribution range of features. Hereinafter, the distribution range of features will be referred to as "feature distribution range".

In S1102 the apparatus program 35 updates the weighting factor data included in the selection criteria data on the basis of the feature distribution ranges calculated in S1101.

First, the apparatus program 35 determines, for each feature type, whether the feature distribution ranges calculated in S1101 overlap among the aggregates.

When the apparatus program 35 determines that the distribution ranges of features do not overlap among the aggregates, the apparatus program 35 updates the weighting factor data included in the selection criteria data so that the weighting factor corresponding to this feature type is larger. This action gives more priority to features of this type in the selection procedure.

When the apparatus program 35 determines that the feature distribution ranges overlap among the aggregates, the apparatus program 35 updates the weighting factor data included in the selection criteria data so that the weighting factor corresponding to this feature type is smaller. This action gives less priority to features of this type in the selection procedure.

Here, some specific examples will be given. It will be assumed that two aggregates are created in S902 (an aggregate a and an aggregate b). The feature distribution range for the feature type "the number of characters" is between 85 and 103 characters in the aggregate a and between 350 and 440 characters in the aggregate b. In this case, the feature distribution ranges of the type "the number of characters" do not overlap between the aggregates a and b. Accordingly, the apparatus program 35 increases the weighting factor for the feature type "the number of characters" (an increase of 10%, for example) and updates the weighting factor data.

When the feature distribution ranges for a certain feature type do not overlap among the plurality of aggregates, the features of this feature type may provide a clear distinction among the aggregates. In S1102 of the variation, the apparatus program 35 increases the weighting factor for the features (the feature type) whose feature distribution ranges do not overlap, thereby increasing the influence of these features when totaling the overall similarity. In other words, the features (the feature type) are given more priority in the selection procedure, thereby improving precision in the automatic selection of one or more workflow parameter sets and further reducing the chance of an incorrect process being executed.

As another example, it will be assumed that the feature distribution ranges for the feature type "the number of characters" is between 94 and 148 characters in the aggregate a and between 124 and 280 characters in the aggregate b. In this case, the feature distribution ranges for the feature type "the number of characters" overlap between the aggregates a and b. Accordingly, the apparatus program 35 reduces the weighting factor for the feature type "the number of characters" (a 10% reduction, for example) and updates the weighting factor data.

When the feature distribution ranges for a certain type overlap among a plurality of aggregates, these aggregates cannot be clearly differentiated on the basis of the features of this feature type. In S1102 of the variation, the apparatus program 35 reduces the weighting factor for the features (the feature type) whose feature distribution ranges overlap, thereby reducing the influence of these features when totaling the overall similarity. In other words, the features (the feature type) are given less priority in the selection procedure, thereby improving precision in the automatic selection of one or more workflow parameter sets and further reducing the chance that an incorrect process will be executed.

Other Variations

The embodiments described above give examples of executing a workflow registration process, workflow execution process, and workflow execution and registration process. However, at least one of the workflow registration process and the workflow execution and registration process may be omitted.

As another variation, step S402 of the workflow execution and registration process (FIG. 5) may be executed after step S403.

The embodiments described above give an example in which the selection criteria for the workflow parameter set is implemented with a decision tree structure, and an example in which the selection criteria is implemented according to overall similarities. However, a support vector machine (SVM) or other technique of pattern recognition may be used as the criteria for selecting one or more workflow parameter sets.

What is claimed is:

1. A non-transitory computer-readable storage medium storing computer-readable instructions, the computer-readable instructions, when executed by a processor, causing the processor to perform:
   a first process comprising:
      (a1) acquiring a first feature data set indicating features of first scan data, the features of the first scan data having different feature types from one another;
      (a2) selecting one or more of a plurality of target workflow parameter sets in accordance with a selection procedure using the first feature data set as input data of the selection procedure, the selection procedure being based on selection criteria indicated by selection criteria data stored in a memory connected to the processor, each of the target workflow parameter sets being a workflow parameter set included in the selection criteria data as a selection candidate for the selection procedure, the workflow parameter set being a set of workflow parameters; and
      (a3) executing a first specific process on the first scan data, the first specific process being a process according to one of the selected one or more target workflow parameter sets; and
   a second process comprising:
      (b1) acquiring a first workflow parameter set;
      (b2) acquiring a second feature data set indicating features of second scan data, the features of the second scan data having different feature types from one another; and
      (b3) updating the selection criteria data to:
         add the acquired first workflow parameter set to selection candidates for the selection procedure; and
         reflect the acquired second feature data set in the selection criteria data.

2. The non-transitory computer-readable storage medium according to claim 1, wherein the computer-readable instructions, when executed by a processor, cause the processor to further perform:
   receiving an input operation for instructing to execute a selected one of a plurality of processes including the first process and the second process,
   wherein the first process is performed in response to the received input operation instructing to execute the first process, and
   wherein the second process is performed in response to the received input operation instructing to execute the second process.

3. The non-transitory computer-readable storage medium according to claim 1, wherein the first process further comprises:

(a4) displaying, on a display connected to the processor, a screen prompting to perform an input operation for instructing whether or not to execute the first specific process; and (a5) receiving the input operation, and wherein the first specific process is executed in response to the received input operation instructing to execute the first specific process.

4. The non-transitory computer-readable storage medium according to claim 3, wherein the first process further comprises:

(a6) updating, in response to the received input operation instructing to execute the first specific process, the selection criteria data to give priority in the selection procedure to the one of the selected one or more target workflow parameter sets.

5. The non-transitory computer-readable storage medium according to claim 3, wherein the first process further comprises:

(a7) acquiring, in response to the received input operation instructing not to execute the first specific process, a second workflow parameter set; and (a8) executing a second specific process on the first scan data, the second specific process being a process according to the acquired second workflow parameter set.

6. The non-transitory computer-readable storage medium according to claim 5, wherein the first process further comprises:

(a9) updating, in response to the processor acquiring the second workflow parameter set, the selection criteria data to:
add the acquired second workflow parameter set to selection candidates for the selection procedure; and
reflect the acquired first feature data set in the selection criteria data.

7. The non-transitory computer-readable storage medium according to claim 1, wherein the second process further comprises:

(b4) executing a third specific process on the second scan data, the third specific process being a process according to the acquired first workflow parameter set.

8. The non-transitory computer-readable storage medium according to claim 1, wherein the second process further comprises:

(b5) receiving, in response to the processor performing the (b3) updating, a specific input operation, the specific input operation being an input operation for instructing to give priority in the selection procedure to a designated one of the feature types; and (b6) updating, in response to the processor receiving the specific input operation, the selection criteria data to give priority in the selection procedure to the designated one of the feature types.

9. The non-transitory computer-readable storage medium according to claim 1, wherein the first process further comprises:

(a10) receiving, in response to the processor acquiring the first feature data set, a specific input operation, the specific input operation being an input operation for instructing to give priority in the selection procedure to a designated one of the feature types; and (a11) updating, in response to the processor receiving the specific input operation, the selection criteria data to give priority in the selection procedure to the designated one of the feature types.

10. The non-transitory computer-readable storage medium according to claim 1, wherein the selection criteria data includes a plurality of target feature data sets, the plurality of target feature data sets being a plurality of feature data sets associated with the plurality of target workflow parameter sets in one-to-one basis, the plurality of target feature data sets indicating respective ones of a plurality of target feature sets, each of the plurality of target feature sets being a set of features, and wherein the second process further comprises:

(b7) creating an aggregate of specific target feature data sets, the specific target feature data sets being the target feature data sets associated with the target workflow parameter sets having the same content as one another;

(b8) calculating, for each of the feature types, a dispersion in features indicated by the specific target feature data sets in the aggregate; and (b9) updating the selection criteria data to give priority in the selection procedure to the feature of the feature type having the lowest of the calculated dispersions.

11. The non-transitory computer-readable storage medium according to claim 1, wherein the selection criteria data includes a plurality of target feature data sets, the plurality of target feature data sets being a plurality of feature data sets associated with the plurality of target workflow parameter sets in one-to-one basis, the plurality of target feature data sets indicating respective ones of a plurality of target feature sets, each of the plurality of target feature sets being a set of features, and wherein the second process comprises:

(b10) creating a plurality of aggregates of specific target feature data sets, the specific target feature data sets in each of the plurality of aggregates being the target feature data sets associated with the target workflow parameter sets having the same content as one another;

(b11) calculating, for each of the feature types, a distribution range of features indicated by the specific target feature data sets in each of the aggregates; and (b12) updating, when the calculated distributions for a feature type are not overlapped among the aggregates, the selection criteria data to give priority in the selection procedure to the feature of the feature type.

12. The non-transitory computer-readable storage medium according to claim 1, wherein the selection criteria data includes a plurality of target feature data sets, the plurality of target feature data sets being a plurality of feature data sets associated with the plurality of target workflow parameter sets in one-to-one basis, the plurality of target feature data sets indicating respective ones of a plurality of target feature sets, each of the plurality of target feature sets being a set of features, and wherein the second process comprises:

(b13) creating a plurality of aggregates of specific target feature data sets, the specific target feature data sets in each of the plurality of aggregates being the target feature data sets associated with the target workflow parameter sets having the same content as one another;

(b14) calculating, for each of the feature types, a distribution range of features indicated by the specific target feature data sets in each of the aggregates; and (b15) updating, when the calculated distributions for a feature type are overlapped among the aggregates, the selection criteria data to give less priority in the selection procedure to the feature of the feature type.

13. The non-transitory computer-readable storage medium according to claim 1, wherein the selection criteria indicated by the selection criteria data has a decision tree structure, the decision tree structure having:
a plurality of nodes including a root node and forming a hierarchical structure with the root node at a top of the hierarchical structure, each of the plurality of nodes indicating a condition concerning one of the feature types, the condition being used for determining which connected link to select; and
a plurality of links each of which connects one node of the plurality of nodes with one of:
another node of the plurality of nodes; and
one or more of the plurality of target workflow parameter sets, wherein the selection procedure based on the selection criteria includes:
a link selection operation of selecting one of the links connected to a node by comparing the feature included in the input data with the condition;
a node transfer operation of performing, when the selected link is connected to another node, the link selection operation for the another node; and
a terminal operation of selecting, when the selected link is connected to the one or more of the plurality of target workflow parameter sets, the one or more of the plurality of target workflow parameter sets, and
wherein, in the selection procedure based on the selection criteria, the link selection operation for the root node is first performed and then the link selection operation and the node transfer operation are repeated until the terminal operation is performed, whereby one or more target workflow parameter sets selected in the terminal operation are determined to be one or more workflow parameter sets that match the selection criteria.

14. The non-transitory computer-readable storage medium according to claim 13, wherein the second process further comprises:
(b16) receiving a specific input operation, the specific input operation being an input operation for instructing to give priority in the selection procedure to a designated one of the feature types; and
(b17) updating, in response to the processor receiving the specific input operation, the selection criteria data to move a specific node to a higher level in the hierarchical structure, the specific node being one of the plurality of nodes and indicating a specific condition, the specific condition being a condition concerning the designated one of the feature types.

15. The non-transitory computer-readable storage medium according to claim 13, wherein the first process further comprises:
(a12) receiving a specific input operation, the specific input operation being an input operation for instructing to give priority in the selection procedure to a designated one of the feature types; and
(a13) updating, in response to the processor receiving the specific input operation, the selection criteria data to move a specific node to a higher level in the hierarchical structure, the specific node being one of the plurality of nodes and indicating a specific condition, the specific condition being a condition concerning the designated one of the feature types.

16. The non-transitory computer-readable storage medium according to claim 1, wherein the selection criteria data includes a plurality of target feature data sets, the plurality of target feature data sets being a plurality of feature data sets associated with the plurality of target workflow parameter sets in one-to-one basis, the plurality of target feature data sets indicating respective ones of a plurality of target feature sets, each of the plurality of target feature sets being a set of features,
wherein, in the selection procedure based on the selection criteria indicated by the selection criteria data, an overall similarity of the target feature set to an input feature set is calculated for each of the plurality of target feature sets and then one or more specific target workflow parameter sets of the plurality of target workflow parameter sets, the specific target workflow parameter set being the target workflow parameter set associated with the target feature data set indicating the target feature set having the highest overall similarity, the input feature set being a set of features indicated by input feature data set used as the input data of the selection procedure,
wherein the overall similarity is a numerical value obtained by totaling individual similarities of the target feature set to the input feature set for the feature types, each of the individual similarities is a numerical value specifying a degree at which a feature of one type included in the input feature set is similar to a feature of the same type in the target feature set, and
wherein the criteria data further includes a method of calculating the overall similarity and a method of calculating the individual similarity.

17. The non-transitory computer-readable storage medium according to claim 16, wherein the (b3) updating includes the acquired second feature data set in the selection criteria data in association with the acquired first workflow parameter set.

18. The non-transitory computer-readable storage medium according to claim 17, wherein the selection criteria data further includes weighting factor data indicating weighting factors corresponding to respective ones of the feature types, and
wherein, in the selection procedure based on the selection criteria indicated by the selection criteria data, a specific numerical value is calculated for each of the feature types and the overall similarity is calculated by totaling the calculated specific numerical values, the specific numerical value for a feature type being calculated by multiplying the individual similarity for the feature type by a weighting factor corresponding to the feature type.

19. The non-transitory computer-readable storage medium according to claim 18, wherein the second process further comprises:
(b18) creating an aggregate of specific target feature data sets, the specific target feature data sets being the target feature data sets associated with the target workflow parameter sets having the same content as one another;
(b19) calculating, for each of the feature types, a dispersion in features indicated by the specific target feature data sets in the aggregate; and
(b20) updating the selection criteria data to assign a larger weighting factor to the feature of the feature type having the lower dispersion.

20. An image data processing system comprising at least one processor, the image data processing system being configured to perform:

a first process comprising:
- (a1) acquiring a first feature data set indicating features of first scan data, the features of the first scan data having different feature types from one another;
- (a2) selecting one or more of a plurality of target workflow parameter sets in accordance with a selection procedure using the first feature data set as input data of the selection procedure, the selection procedure being based on selection criteria indicated by selection criteria data stored in a memory connected to one of the at least one processor, each of the target workflow parameter sets being a workflow parameter set included in the selection criteria data as a selection candidate for the selection procedure, the workflow parameter set being a set of workflow parameters; and
- (a3) executing a first specific process on the first scan data, the first specific process being a process according to one of the selected one or more target workflow parameter sets; and a second process comprising:
- (b1) acquiring a first workflow parameter set;
- (b2) acquiring a second feature data set indicating features of second scan data, the features of the second scan data having different feature types from one another; and
- (b3) updating the selection criteria data to:
  - add the acquired first workflow parameter set to selection candidates for the selection procedure; and
  - reflect the acquired second feature data set in the selection criteria data.

21. An image data processing apparatus comprising a processor configured to perform:

a first process comprising:
- (a1) acquiring a first feature data set indicating features of first scan data, the features of the first scan data having different feature types from one another;
- (a2) selecting one or more of a plurality of target workflow parameter sets in accordance with a selection procedure using the first feature data set as input data of the selection procedure, the selection procedure being based on selection criteria indicated by selection criteria data stored in a memory connected to the processor, each of the target workflow parameter sets being a workflow parameter set included in the selection criteria data as a selection candidate for the selection procedure, the workflow parameter set being a set of workflow parameters; and
- (a3) executing a first specific process on the first scan data, the first specific process being a process according to one of the selected one or more target workflow parameter sets; and a second process comprising:
- (b1) acquiring a first workflow parameter set;
- (b2) acquiring a second feature data set indicating features of second scan data, the features of the second scan data having different feature types from one another; and
- (b3) updating the selection criteria data to:
  - add the acquired first workflow parameter set to selection candidates for the selection procedure; and
  - reflect the acquired second feature data set in the selection criteria data.

* * * * *